United States Patent
Guthard et al.

(10) Patent No.: US 9,849,738 B2
(45) Date of Patent: Dec. 26, 2017

(54) FIFTH WHEEL CONVERSION HITCH MOUNTING SYSTEM

(71) Applicant: HORIZON GLOBAL AMERICAS INC., Plymouth, MI (US)

(72) Inventors: Henry J. Guthard, Livonia, MI (US); Richard W. McCoy, Granger, IN (US)

(73) Assignee: HORIZON GLOBAL AMERICAS INC., Plymouth, MI (US)

(*) Notice: Subject to any disclaimer, the term of this patent is extended or adjusted under 35 U.S.C. 154(b) by 0 days.

(21) Appl. No.: 15/058,985

(22) Filed: Mar. 2, 2016

(65) Prior Publication Data

US 2016/0280021 A1 Sep. 29, 2016

Related U.S. Application Data

(60) Provisional application No. 62/127,129, filed on Mar. 2, 2015, provisional application No. 62/138,819, filed on Mar. 26, 2015.

(51) Int. Cl.
| | |
|---|---|
| *B60D 1/00* | (2006.01) |
| *B60D 1/01* | (2006.01) |
| *B60F 1/00* | (2006.01) |
| *B62D 53/08* | (2006.01) |
| *B60D 1/48* | (2006.01) |

(52) U.S. Cl.
CPC ............ *B60D 1/015* (2013.01); *B60D 1/488* (2013.01); *B60F 1/00* (2013.01); *B62D 53/0828* (2013.01)

(58) Field of Classification Search
CPC ..................................................... B62D 53/08
See application file for complete search history.

(56) References Cited

U.S. PATENT DOCUMENTS

| | | |
|---|---|---|
| 4,721,323 A | 1/1988 | Czuk et al. |
| 5,509,682 A | 4/1996 | Lindenman et al. |
| 5,516,137 A | 5/1996 | Kass et al. |
| 5,529,329 A | 6/1996 | McCoy |
| D378,077 S | 2/1997 | Lindenman et al. |
| D380,719 S | 7/1997 | Lindenman et al. |
| 5,707,070 A | 1/1998 | Lindenman et al. |
| D395,025 S | 6/1998 | Lindenman et al. |
| D423,998 S | 5/2000 | Lindenman et al. |

(Continued)

FOREIGN PATENT DOCUMENTS

CA 2157730 A 3/1996

OTHER PUBLICATIONS

Patent Cooperation Treaty (PCT), International Search Report and Written Opinion for Application PCT/US 16/20476, dated May 17, 2016, 8 pp., International Searching Authority, US.

*Primary Examiner* — Kevin Hurley
(74) *Attorney, Agent, or Firm* — McDonald Hopkins LLC

(57) ABSTRACT

An underbed hitch mounting system is described. The mounting system may be utilized for towing vehicles wherein the mounting system may selectively accommodate either a fifth wheel hitch or a gooseneck hitch. The mounting system may include at least one rail capable of being connected to a vehicle frame, wherein the rail includes at least one socket. The socket may be engaged with a receiving member, wherein the receiving member may be engaged with a leg of a fifth wheel hitch. A mid rail may be connected to the rails and may include a hitch ball socket that is capable of engagement with a hitch.

6 Claims, 23 Drawing Sheets

(56) References Cited

U.S. PATENT DOCUMENTS

| | | | |
|---|---|---|---|
| 6,158,761 A * | 12/2000 | King | B60D 1/01 280/495 |
| 6,170,851 B1 | 1/2001 | Lindenman et al. | |
| 6,398,249 B1 | 6/2002 | Lindenman et al. | |
| 6,682,089 B2 | 1/2004 | McCoy et al. | |
| 6,685,210 B2 | 2/2004 | Lindenman et al. | |
| D488,412 S | 4/2004 | Lindenman et al. | |
| D495,279 S | 8/2004 | Lindenman et al. | |
| 6,824,157 B1 * | 11/2004 | Putnam | B60D 1/06 280/490.1 |
| D500,715 S | 1/2005 | Lindenman et al. | |
| 6,851,695 B2 | 2/2005 | Lindenman et al. | |
| 6,942,236 B2 | 9/2005 | Lindenman et al. | |
| 7,121,573 B2 * | 10/2006 | Lindenman | B62D 53/08 280/433 |
| 7,261,311 B2 | 8/2007 | Lindenman et al. | |
| 7,264,259 B2 | 9/2007 | Lindenman et al. | |
| 7,556,278 B2 | 7/2009 | Roberts et al. | |
| 7,654,552 B2 | 2/2010 | Hoopes et al. | |
| 7,673,895 B1 | 3/2010 | Hesse et al. | |
| 7,828,317 B2 | 11/2010 | Withers et al. | |
| 7,997,608 B2 | 8/2011 | Mater et al. | |
| D670,211 S | 11/2012 | Stanifer et al. | |
| D670,212 S | 11/2012 | Stanifer et al. | |
| 8,360,458 B2 | 1/2013 | Stanifer et al. | |
| 8,414,009 B2 | 4/2013 | Stanifer et al. | |
| 8,430,418 B2 | 4/2013 | McCoy et al. | |
| 8,602,438 B2 | 12/2013 | Stanifer et al. | |
| 8,876,142 B1 | 11/2014 | Karasch et al. | |
| 8,960,705 B2 * | 2/2015 | McCall | B60D 1/01 280/438.1 |
| 9,067,468 B2 | 6/2015 | Stanifer et al. | |
| 2004/0070170 A1 | 4/2004 | Lindenman et al. | |
| 2005/0248124 A1 | 11/2005 | Phillips et al. | |
| 2007/0187925 A1 | 8/2007 | Lindenman et al. | |
| 2008/0315557 A1 | 12/2008 | Stanifer et al. | |
| 2009/0085326 A1 * | 4/2009 | Linger | B62D 53/0828 280/433 |
| 2012/0018978 A1 | 1/2012 | McCoy et al. | |
| 2012/0018979 A1 | 1/2012 | McCoy et al. | |
| 2012/0145851 A1 * | 6/2012 | McCoy | B60D 1/488 248/221.11 |
| 2013/0200593 A1 | 8/2013 | McCoy et al. | |
| 2013/0307248 A1 | 11/2013 | McCoy | |
| 2014/0265244 A1 | 9/2014 | Curl et al. | |
| 2015/0102584 A1 * | 4/2015 | Hartleip | B60D 1/065 280/511 |
| 2016/0107492 A1 | 4/2016 | McCoy | |

\* cited by examiner

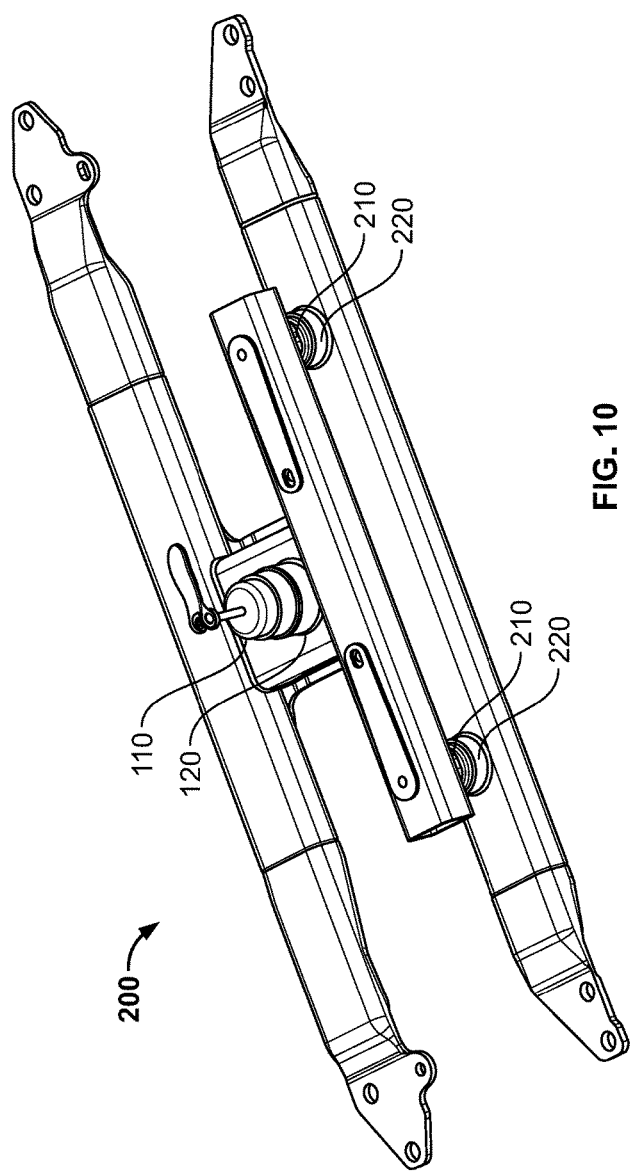
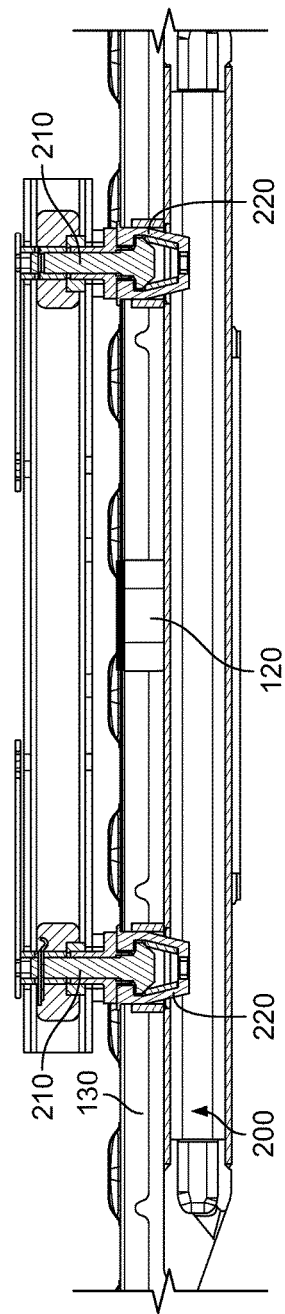
FIG. 10
FIG. 11

FIFTH WHEEL CONVERSION HITCH MOUNTING SYSTEM

CROSS-REFERENCE TO RELATED APPLICATIONS

This application claims priority to U.S. provisional patent application No. 62/127,129 filed on Mar. 2, 2015 titled FIFTH WHEEL CONVERSION HITCH MOUNTING SYSTEM and to U.S. provisional patent application No. 62/138,819 filed on Mar. 26, 2015 titled FIFTH WHEEL CONVERSION HITCH MOUNTING SYSTEM each of which are incorporated by reference in their entirety.

FIELD OF INVENTION

The present invention is generally related to a towing apparatus and, more particularly, to a conversion hitch mounting system having an underbed hitch mounting system, an above bed adapter frame, and a fifth wheel conversion hitch.

BACKGROUND

Many vehicles are designed to transport freight, goods, merchandise, personal property, and other such cargo. Often, a hitch assembly is utilized to connect a towed vehicle or trailer to a towing vehicle, such as a truck for example, to increase the capacity to transport goods. Many types of coupling devices have been developed for providing this connection between a towing vehicle and a towed vehicle.

It is well known to utilize a trailer hitch to connect a trailer to a towing vehicle. There are many different types of trailer hitches that may be attached to the towing vehicle in a variety of ways, depending on the type of hitch to be used. Some of the most common types of hitches include gooseneck, fifth wheel, front mount, and the like. Often, the type of hitch used to connect a trailer and a vehicle is determined by the size, shape and other features of the trailer. For example, large trailers such as semi trailers and campers often require a fifth wheel hitch, whereas, small and midsized trailers, such as boat trailers, are better suited for gooseneck trailer hitches. Typically, trailers are connected to a towing vehicle by way of a ball hitch secured to the vehicle and a ball socket coupling mechanism on the trailer that mounts over the ball and thereby allows for the trailer to pivot behind the towing vehicle.

Due to the size and weight of many trailers, towing a trailer may cause unsafe conditions for the towing vehicle, such as fishtailing or other unsafe effects. To avoid these unwanted effects, it is preferable to evenly balance and distribute the weight of the trailer over the wheels of the towing vehicle. This is best accomplished by connecting the hitch to the frame or base of the towing vehicle, near the vehicle's center of gravity. Accordingly, fifth wheel and gooseneck hitches mounted to pickup trucks are often connected to the truck frame underneath the bed of the truck.

Traditional fifth wheel hitches include a head assembly for receiving a king pin on a trailer, a base having a plurality of legs, and one or more mounting rails. The mounting rails may be permanently fixed to the frame of a vehicle, such as a pickup truck. For example, the mounting rails may be connected between two portions of a pickup truck frame underneath the truck bed. The mounting rails may include a plurality of holes for receiving the legs of the fifth wheel hitch.

Corresponding openings may be cut in the truck bed and aligned with the holes in the mounting rails. The legs of the fifth wheel hitch may be connected to holes in the mounting rails through the openings in the truck bed, thereby securing the fifth wheel hitch to the frame of the truck. When the fifth wheel hitch is not in use, the legs may be disconnected from the holes in the rails and the hitch may be removed from the bed of the truck. Caps may be placed over the holes to allow the truck bed to be used for other purposes.

Traditional gooseneck hitches also mount to a pickup truck frame, beneath the bed of a truck. A gooseneck hitch is designed for use in a pickup truck similar to a fifth wheel. The difference is that the gooseneck uses a ball and coupler verses a kingpin and pin receiver. Gooseneck hitches include a mounting plate configured to connect to the frame of a truck, a receptacle in the mounting plate configured to receive a ball hitch, and a hitch ball removably connected to the receptacle and configured to engage a coupling member of the trailer. An opening in the bed of the truck is aligned with the receptacle in the mounting plate, allowing the hitch ball to connect to the receptacle through the opening in the truck bed. The hitch balls themselves are typically removable or retractable so that when the hitch is not in use, the hitch ball may be removed or retracted when not in use, so as not to obstruct the bed of the pick-up truck in any significant manner.

Towing vehicles are generally arranged to accommodate either a fifth wheel hitch or a gooseneck hitch, but not both. To convert a towing vehicle from accommodating a fifth wheel hitch to a gooseneck hitch or vice versa is time and labor intensive and inefficient. Furthermore, both fifth wheel hitches and gooseneck hitches are preferably mounted to the vehicle frame near the vehicle's center of gravity. However, since fifth wheel hitches and gooseneck hitches use different mounting configurations, traditionally only one hitch can occupy this location.

Additionally, gooseneck hitch type mounting systems that utilize a gooseneck ball and collar assembly particularly require that the torque and towing capacity is located thru the point of the gooseneck ball and collar. These systems are generally restrictive for other types of trailer options for short bed trucks (typically less than 6 foot). Therefore, there is a need in the art for an improved apparatus for towing vehicles that allow for selectively accommodation of either a fifth wheel hitch or a gooseneck hitch. Additionally, there is a need to provide an assembly where a fifth wheel hitch may be inserted into the existing gooseneck color or ports that form the attachment points without adding any other permanent structure, wherein the fifth wheel hitch may be removed when not needed. Further, there is a need to provide a design that my incorporate the structural position of the gooseneck ball location and one or both of the existing safety chain hold downs already existing on the gooseneck hitch that will prevent the fifth wheel hitch from twisting and allow for fifth wheel hitch assemblies on vehicles with short bed options.

SUMMARY

A fifth wheel conversion hitch mounting system is described. The mounting system may be utilized for towing vehicles wherein the mounting system may selectively accommodate either a fifth wheel hitch or a gooseneck hitch. The mounting system may include an underbed hitch assembly including at least one rail capable of being connected to a vehicle frame, wherein the rail includes at least one socket. The socket may be engaged with a receiving member, wherein the receiving member may be engaged with a leg of a fifth wheel hitch. A mid rail may be connected to the rails and may include a hitch ball socket that is capable of engagement with a hitch. The fifth wheel hitch may include a plurality of attachment points to engage the fifth wheel hitch to the mounting system and prevent rotation of the fifth wheel hitch relative to the vehicle. The attachment points include a gooseneck collar and at least one safety chain hold down, socket, or receiving member. In one embodiment, the mounting system includes at least one of two and three attachment points between the fifth wheel hitch and mounting system.

In another embodiment, provide is an adapter assembly to attach the underbed hitch to the fifth wheel hitch conversion member. The adapter assembly may include a frame having two or three points of connection with the mounting system.

DESCRIPTION OF THE DRAWINGS

Objects and advantages together with the operation of the invention may be better understood by reference to the following detailed description taken in connection with the following illustrations, wherein:

FIG. 10 is a perspective view of the underbed hitch mounting system;

FIG. 11 is a cross sectional side view of the underbed hitch mounting system of FIG. 10 attached to the bed of a vehicle;

DETAILED DESCRIPTION

Figure 1:
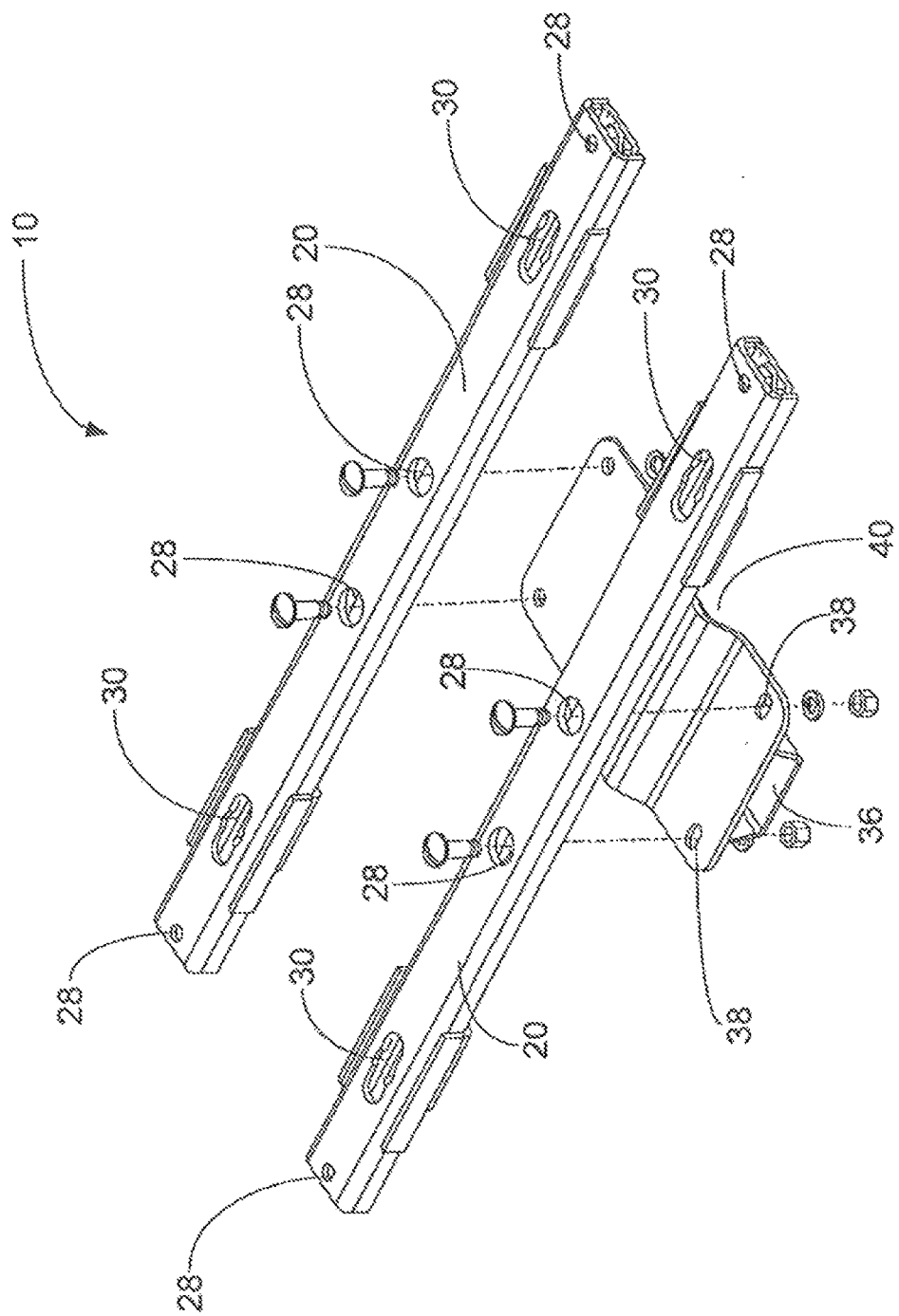
FIG. 1 illustrates a perspective and partially exploded view of an underbed hitch mounting system in an embodiment of the invention.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

FIGS. 1-7 illustrate an underbed hitch mounting system 10 as disclosed by commonly owned U.S. Pat. No. 8,414,009 which is incorporated by reference. The underbed hitch mounting system 10 may be used with towing vehicles that allow for selectively accommodating either a fifth wheel hitch 55 or a gooseneck hitch. Trailer hitches, such as a gooseneck or fifth wheel hitch 55 may be mounted to a truck bed. These types of hitches are often mounted beneath the truck bed in conjunction with the truck's own frame rails 52, such as with cross members or rails 20, for example.

The underbed hitch mounting system 10 may include at least one rail mount or cross member 20 and at least one mid rail or adapter plate 40. For example, the mounting system 10 may include two rails 20 and one mid rail or adapter plate 40. The rails 20 may be configured to support a gooseneck hitch (not shown) or a fifth wheel hitch 55. Typical fifth wheel hitches 55 may include a plurality of legs 57 to connect the hitch to a vehicle. While the underbed hitch mounting system 10 may be shown and described as having two rails 20 and one mid rail or adapter plate 40, it is to be understood that there may be any appropriate number of rails or adapter plates and it should not be limited to that shown and described herein.

The rails 20 may be of any appropriate shape or size, such as a generally tubular, square or rectangular shape. Each rail 20 may include one or more sockets 30 (FIGS. 1, 2 and 4-6). The sockets 30 may be of any appropriate shaper or size, such as a generally ovular, circular or rectangular shape. The sockets 30 may be configured to receive fasteners or accessories to retain and support the legs 57 of a fifth wheel hitch 55. The legs 57 may be secured to the rails 20 through the sockets 30 by any appropriate means, such as by fasteners, being welded, or the like.

The rails 20 may include connecting holes or mounting apertures 28 (FIGS. 1, 2 and 4-6). The mounting apertures 28 may be of any appropriate shape or size, such as a generally circular, ovular or rectangular shape. There may be any number of appropriate mounting apertures 28 and should not be limited to that shown and described herein.

Figure 2:
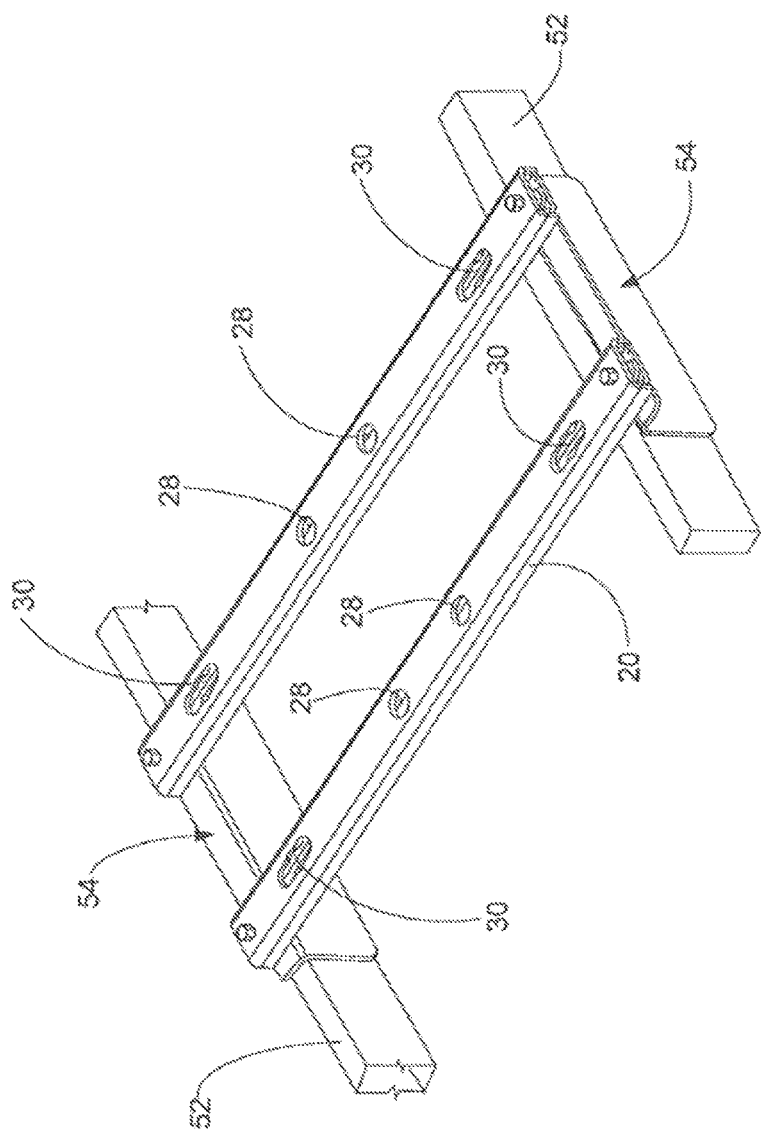
FIG. 2 illustrates a perspective view of a rail assembly.
Figure 4:
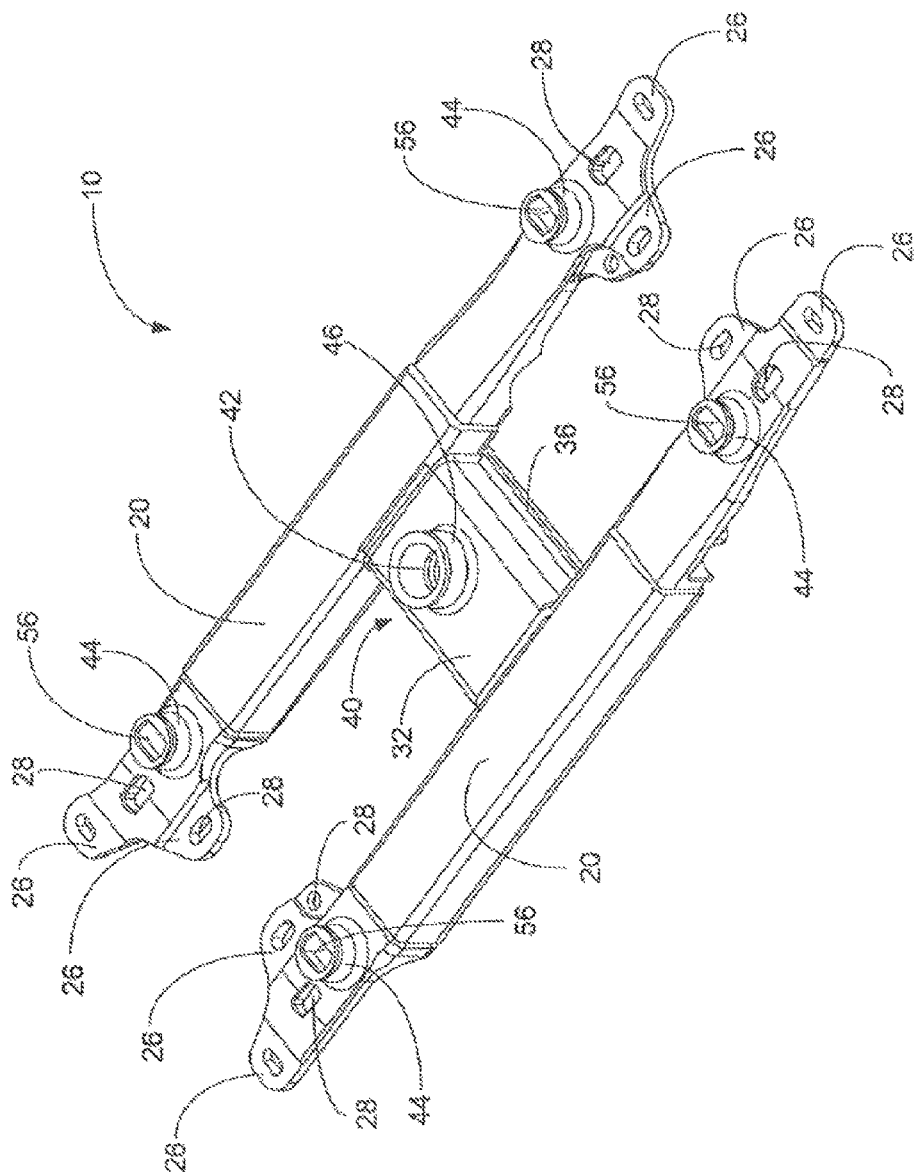
FIG. 4 illustrates a perspective view of an underbed hitch mounting system in an embodiment of the invention.

The mounting apertures 28 may be utilized for connecting another member to the rails 20, such as the adapter plate 40 or attachment brackets 54 (see FIGS. 1, 2 and 4). The mounting apertures 28 may also be used to connect the rails 20 of the hitch mounting system 10 to the underbed of the towing vehicle frame 52. For example, the rails 20 may be connected to the towing vehicle frame 52, such as underneath the truck bed (not shown).

The rails 20 may include one or more attachment brackets 54 (FIG. 2). For example, the mounting system 10 may have two attachment brackets 54. The attachment brackets 54 may be utilized for connecting the rails 20 to the frame 52. The rails 20 may be connected to the attachment brackets 54 by any appropriate means, such as with fasteners, welding or the like. The attachment brackets 54 may be of any appropriate shape or size, such as a general L-shape, rectangular plate or the like. The attachment brackets 54 may be sized and shaped to engage a vehicle frame.

Typical vehicle frames 52 may include two parallel steel members. An end of each rail 20 may connect to a first member of the frame 52 and an opposite end of the rail 20 may connect to a second member of the vehicle frame 52 (FIG. 2). The cross members or rails 20 may extend between the mounting brackets 54. The rails 20 may be of a length sufficient to span the distance between the mounting brackets 54 when those brackets engage the vehicle framework 52. The attachment brackets 54 may form a generally L-shaped bracket to engage the frame 52. The attachment brackets 54 may be attached to the frame 52 by any appropriate means, such as with fasteners, welding or the like.

The mid rail or adapter plate 40 may be of any appropriate shape or size, such as a generally rectangular or tubular shape that may span the length between the rails 20 (FIGS. 1 and 4). The mid rail or adapter plate 40 may be configured to connect to the rails 20. The mid rail or adapter plate 40 may be attached to the rails by any appropriate means, such as with fasteners, welding or the like.

Figure 3:
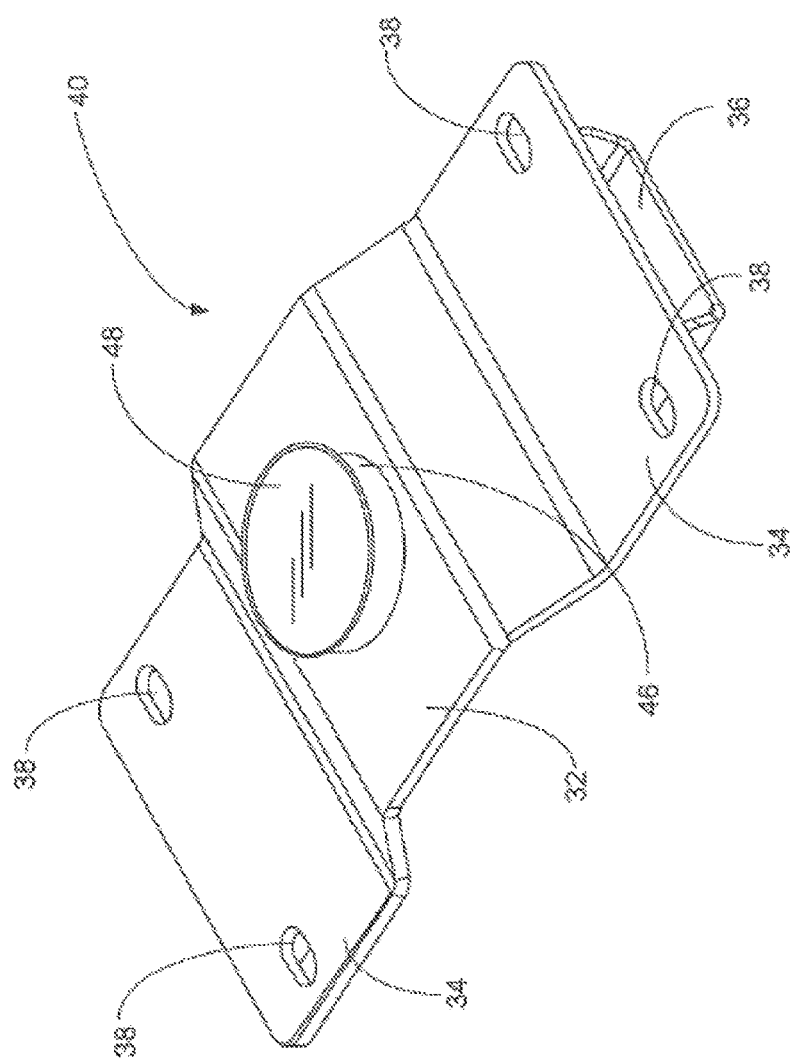
FIG. 3 illustrates a perspective view of an adapter plate.
Figure 5:
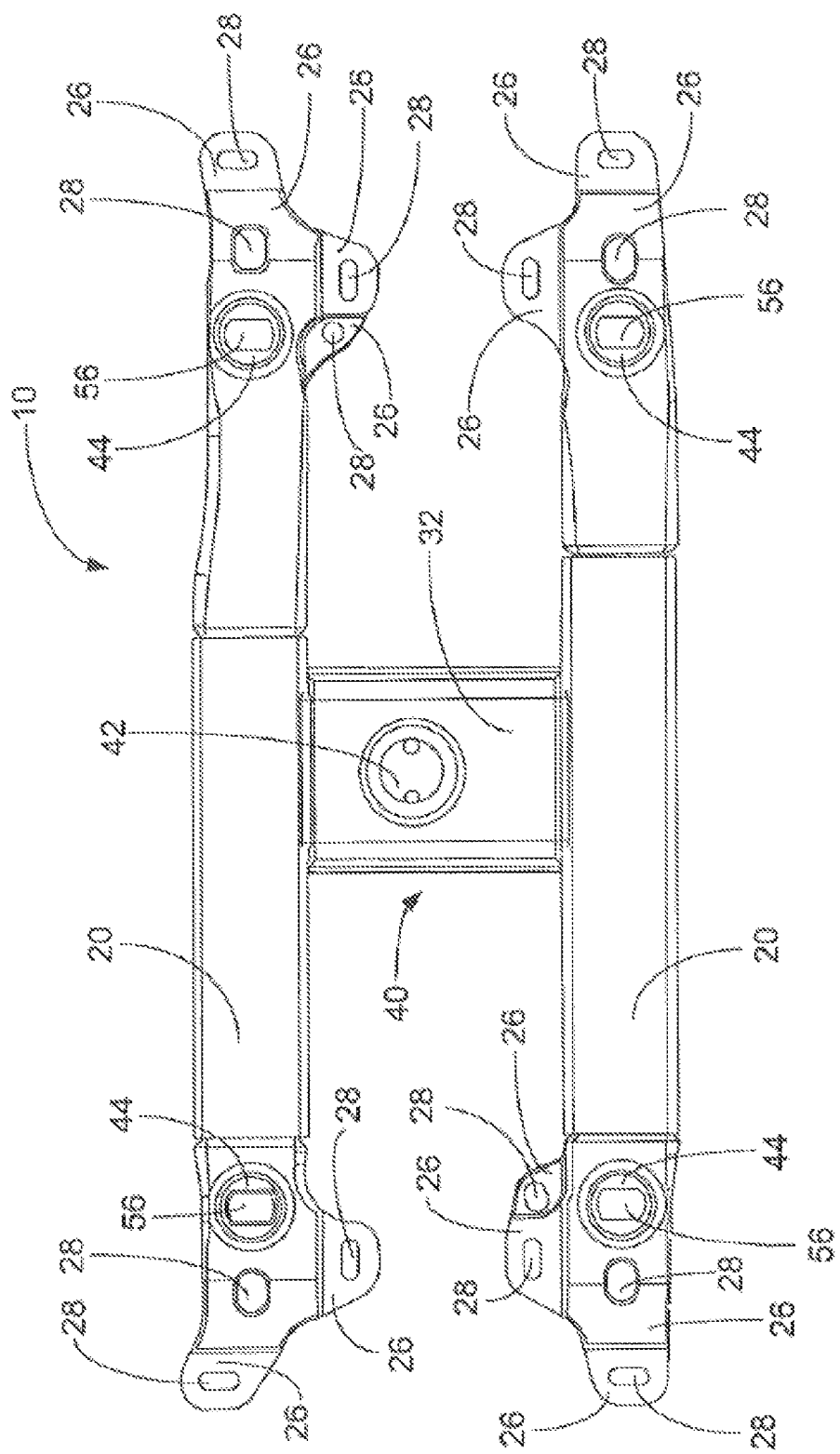
FIG. 5 illustrates a top view of the underbed hitch mounting system of FIG. 4.

The adapter plate 40 may be of a one piece construction or may include several sections that may be secured together. The adapter plate 40 may include a center section 32 and one or more mounting sections 34 extending therefrom. For example, there may be two mounting sections 34 (FIG. 3). As an alternative, there may be no mounting sections 34, such that the center section may be attached directly to the rails 20 (FIGS. 4-6).

The center section 32 may be located between the mounting sections 32. The mounting sections 34 may extend at a downward angle and away from the center section 32, such that the center section 32 may be positioned above the mounting sections 34. The mounting sections 34 may extend in opposite directions away from the center section 32.

The mounting sections 34 may engage the rails 20 at any appropriate location, such as the underside of the rails 20. The mounting sections 34 may be configured to connect to the rails 20 by any appropriate means, such as with fasteners, welding or the like. When the mid rail 40 is connected to the rails 20, the center section 32 may be approximately flush with and parallel to the rails 20 (FIGS. 3 and 4). When the mounting section 34 engages the rails 20, the mounting sections 34 may be approximately parallel to the rails 20. Each mounting section 34 may include one or more openings or rail mounting apertures 38. The mounting apertures 38 may be configured to align with the mounting apertures 28 in the rails 20. The mounting apertures 38 may be of any appropriate shape or size, such as a generally circular, ovular or rectangular shape.

Figure 6:
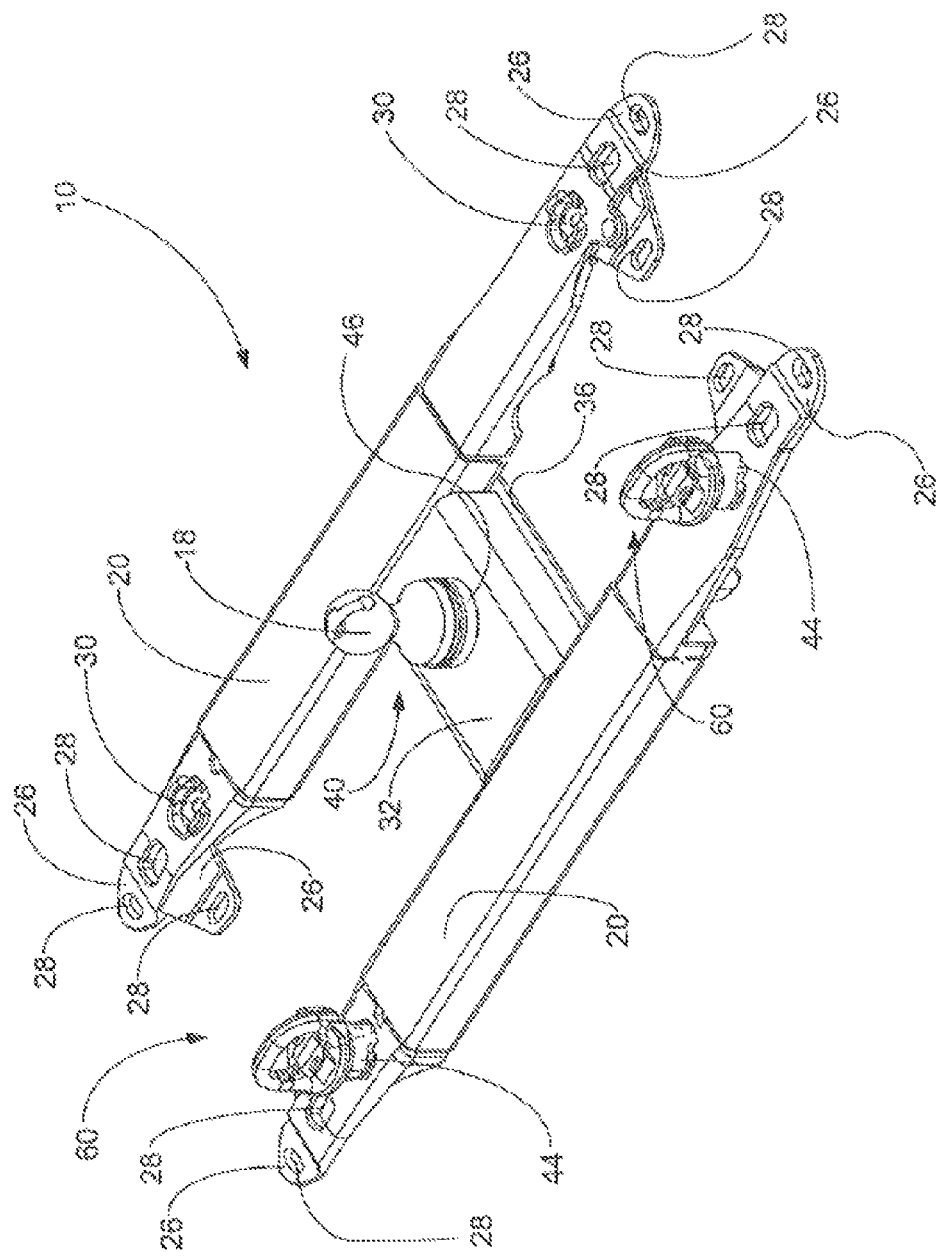
FIG. 6 illustrates a perspective view of an embodiment of the underbed hitch mounting system.
Figure 7:
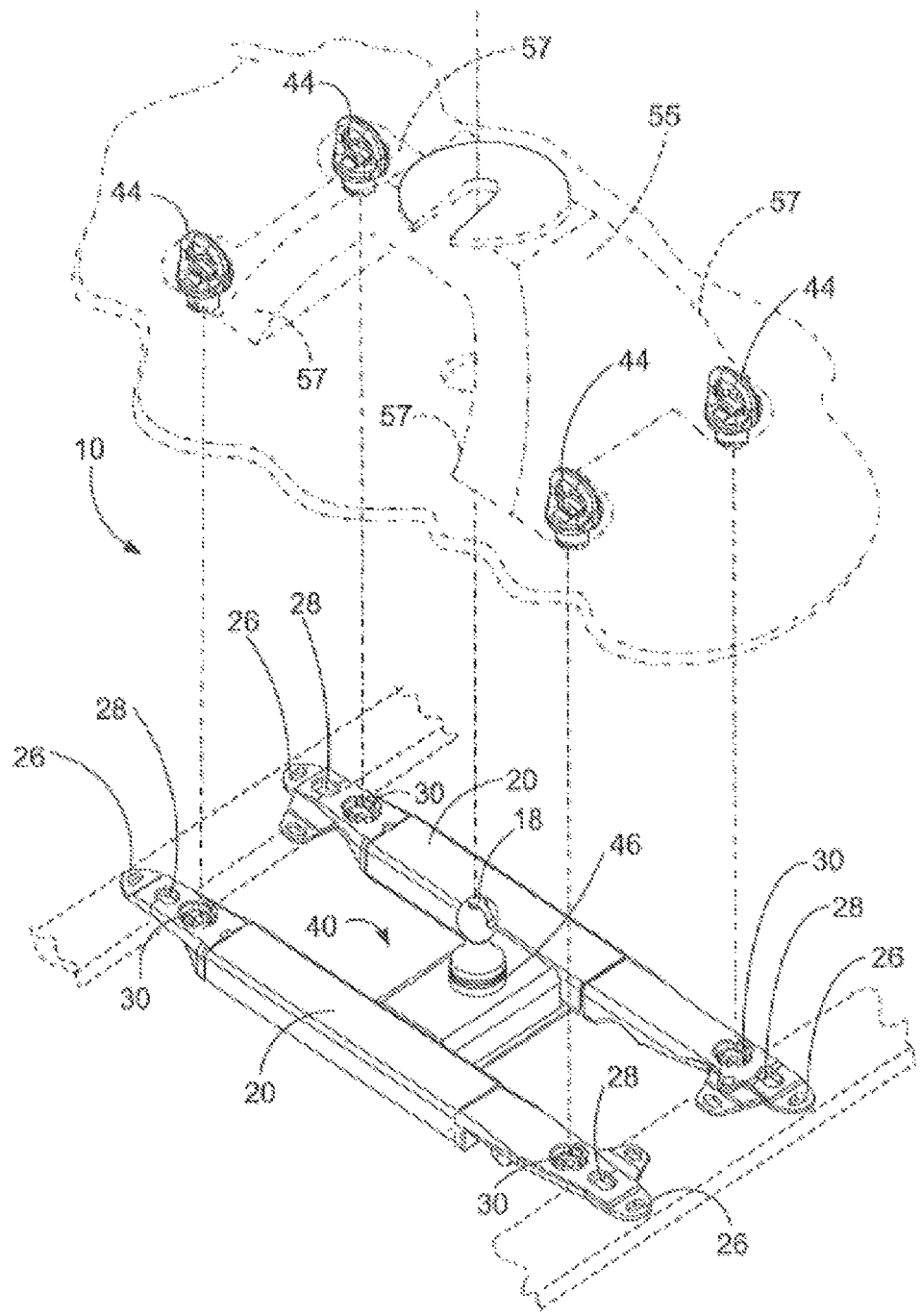
FIG. 7 illustrates a perspective view of embodiments of an underbed hitch mounting system with a fifth wheel hitch in phantom immediately over the underbed hitch mounting system.
Figure 8:
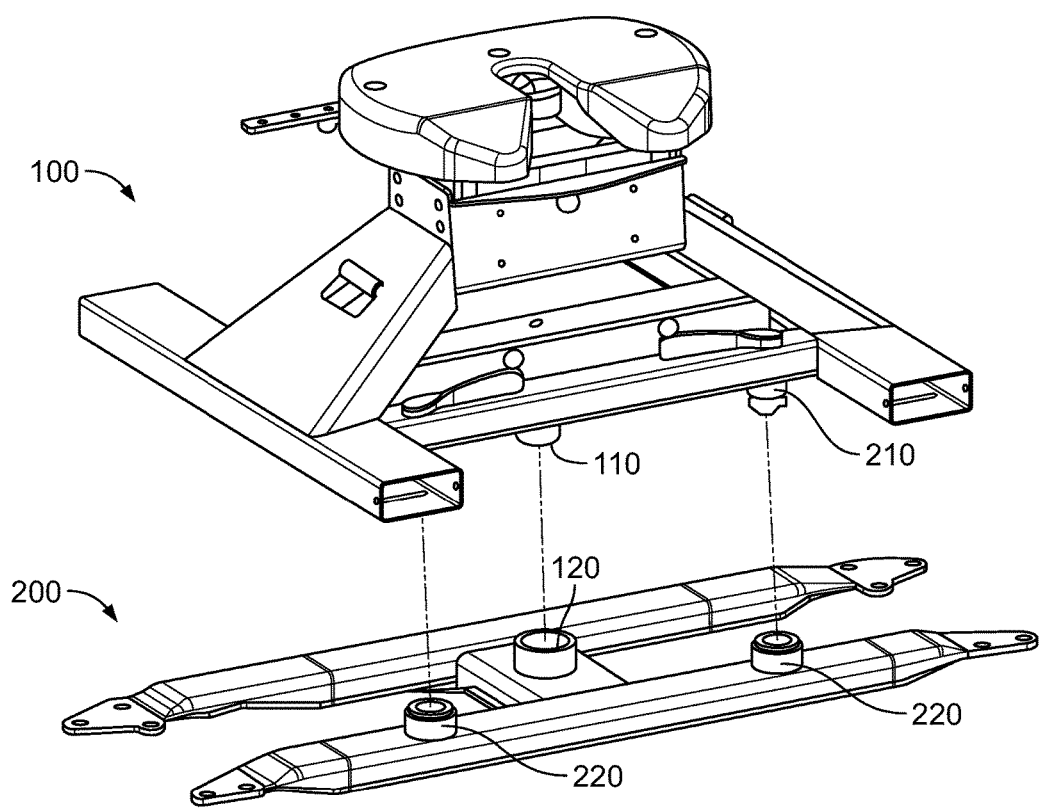
FIG. 8 illustrates a perspective view of another embodiment an underbed hitch mounting system with a fifth wheel hitch.
Figure 9:
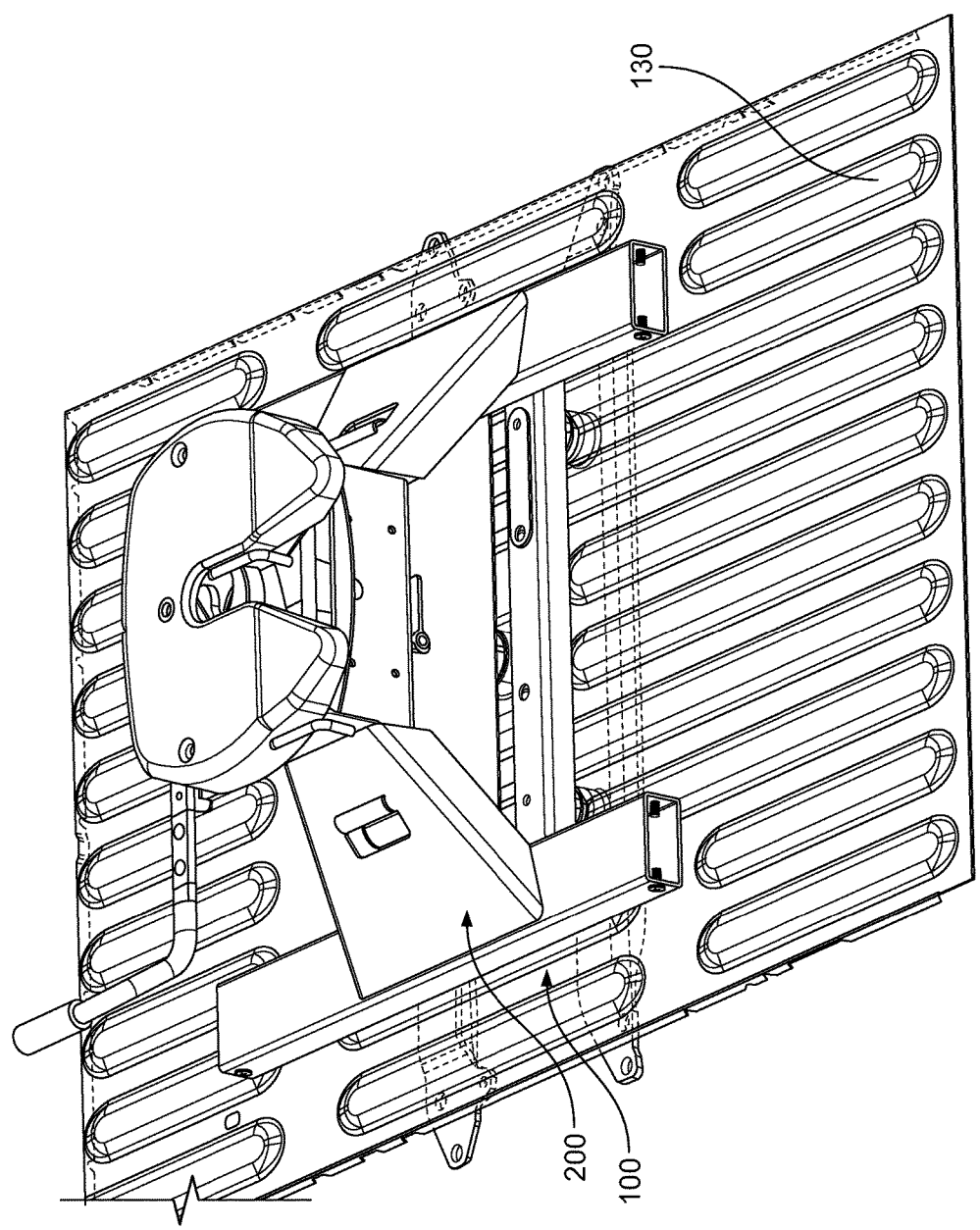
FIG. 9 is a perspective view of the underbed hitch mounting system attached to the fifth wheel hitch on a bed of a vehicle.

The adapter plate or mid rail 40 may also include a base member 36 (FIGS. 3 and 6). The base member 36 may be of any appropriate shape or size, such as a generally square, rectangular or tubular shape. The base member 36 may be attached to the bottom of the adapter plate or mid rail 40. The base member 36 may be attached to the mid rail 40 by any appropriate means, such as by welding, fasteners or the like. The base member 36 may also be secured to the rails 20, such as on the underside of the rails 20 (FIGS. 4 and 6).

The adapter plate or mid rail 40 may be configured to receive a hitch ball 18 (see FIGS. 3-7). For example, the center section 32 may include a hitch ball socket 42 that may be configured to receive the hitch ball 18. The hitch ball socket 42 may be of any appropriate shape or size, such as a generally cylindrical shape. The hitch ball socket 42 may be located at any appropriate position on the adapter plate 40, such as the approximate center of the adapter plate 40. For example, the hitch ball socket 42 may be configured to receive a removable hitch ball 18 with spring-loaded ball bearings. It should be appreciated, however, that the receptacle may be configured to receive any appropriate type of hitch ball 18 and should not be limited to that shown or described herein.

The hitch ball socket 42 may include a raised collar 46 and a cap 48 (FIG. 3). The raised collar 46 may be of any appropriate shape or size, such as one that may extend above and approximately perpendicularly to the surface of the center section 32. The cap 48 may be of any appropriate shape or size, such as one that may engage the collar 46 and cover the hitch ball socket 42 when a hitch ball 18 is not connected to the hitch ball socket 42.

FIGS. 4-6 illustrate another embodiment of the underbed hitch mounting system 10. The underbed hitch mounting system 10 may utilize a puck mounting system whereby the trailer hitch may be installed in the pickup truck bed with only four small holes (not shown). Utilizing a puck mounting system may provide uninhibited use of the truck bed when the hitch is dismounted. The puck mounting system may also provide for a wider platform and mounting surface, which increases the stability. The puck mounting system may be used with any appropriate trailer hitch mounting kit, such as those that utilize rail mounts or cross members 20 for example, such as with the "Signature Series" produced and sold by Cequent.

The underbed hitch mounting system 10 may include at least two rails or cross members 20. The cross members 20 may include sockets 30 for attachment with a puck or receiving member 44. The cross members 20 may be attached to the vehicle framework 52 by any appropriate means, such as with fasteners, by welding or the like.

Holes may be drilled in the truck bed corresponding to the locations of the sockets 30 in the rails 20 and the hitch ball socket 42. A fifth wheel hitch may be removably connected to the sockets 30 in the rails 20 through the holes located in the truck bed. A hitch ball 18 may be removably connected to the hitch ball socket 42 through the hole in the truck bed, whereby a gooseneck hitch may be utilized.

The cross members 20 may be mounted to the truck bed with the use of the receiving members 44. Each receiving member 44 may be mounted in a socket 30 provided in either of the cross members 20. The receiving member 40 may be secured in the socket 30 by any appropriate means, such as with fasteners, welding or the like. For example, a fastener, such as a bolt, could pass through an aperture in the bottom wall of the cross member 20 and be secured in place by a cooperating nut and lock washer (not shown) if desired.

The puck or receiving member 44 may be of any appropriate shape or size, such as a cylindrical, oval, or a square shape, for example, and should not be limited to that shown and described herein. The receiving member 44 may be a one-piece integrally formed member. Each receiving member 44 may also include an aperture 56 that may receive an accessory member 60. The aperture 56 may also be correspondingly shaped and sized to receive the accessory member 60. Any number or variety of accessories 60 may be utilized with the receiving members 44. The accessory member 60 may be any appropriate or desired type of object, such as a cap or a safety chain tie down member. For example, caps (not shown) may be placed over the receiving members 44 or holes in the truck bed when the hitch is not in use.

FIGS. 4 and 5 illustrate an integrally formed mounting system 10, whereby the receiving members 44 may be formed within the cross members 20. FIG. 6 illustrates a mounting system 10 where the receiving members 44 may be placed and secured into sockets 30 located within the cross members 20. The cross members 20 may be attached to one another by the mid rail 40. The hitch ball socket 42 and corresponding hitch ball 18 may be located on the mid rail 40 (FIGS. 4-6).

The underbed hitch mounting system 10 may include any number or variety of mounting flanges 26 and mounting apertures 28 (FIGS. 4-6). The mounting flanges 26 may be of any appropriate shape or size, such as generally rectangular or circular. The mounting flanges 26 may be located at any appropriate position on the rails 20, such as adjacent or at the ends of the rails 20. The mounting apertures 28 may be located in or around the mounting flanges 26. The mounting apertures 28 and mounting flanges 26 may aid in attached the mounting system 10 to the underbed of the towing vehicle or the vehicle framework 52.

As illustrated by the FIGS. 8-15, the present disclosure relates to a gooseneck underbed style hitch 200 that may be operatively attached to the fifth wheel conversion member 100. The fifth wheel conversion member 100 may be attached to the underbed hitch 200 without the use of tools, may be adjustable to account for various structural builds of truck bed configurations, and by be removeable from the hitch 200 as a single unit. The fifth wheel conversion member 100 may be securely locked to a bed of a vehicle and allow for quick assembly thereon.

In the illustrated embodiment, provided is a three point attachment of a fifth wheel conversion member 100 with a three (3) point attachment system that allows for securing a towed vehicle to a towing vehicle. The under bed style hitch 200 includes a primary receiver 120 such as a gooseneck collar that is configured to receive an attachment device 110 such as a of the fifth wheel conversion member 100. The attachment device 110 may protrude from the bottom of the fifth wheel structure 100. The primary receiver 120 may operably attach to the attachment device 110 and may include a ball joint for operable attachment between the primary receiver 120 and the attachment device 110. The primary receiver 120 may be positioned along the center portion of a bed 130 of a vehicle.

The hitch 200 may additionally include secondary receivers 220 which may be similar to the drop in receivers 44 as disclosed above. Additionally, the secondary receivers 220 may be safety chain mounting connections. However, in this embodiment, the hitch 200 may merely include one (1) or two (2) secondary receivers 220 positioned on the hitch 200 to receive the respective fasteners 210 that extend from the fifth wheel conversion hitch 100. The fasteners 210 may be a clamping t-bold, rod, or other fastener assembly. The assembly may be quarter turn locking assemblies that are designed to meet or exceed SAE J2638 testing requirements.

Figure 12:
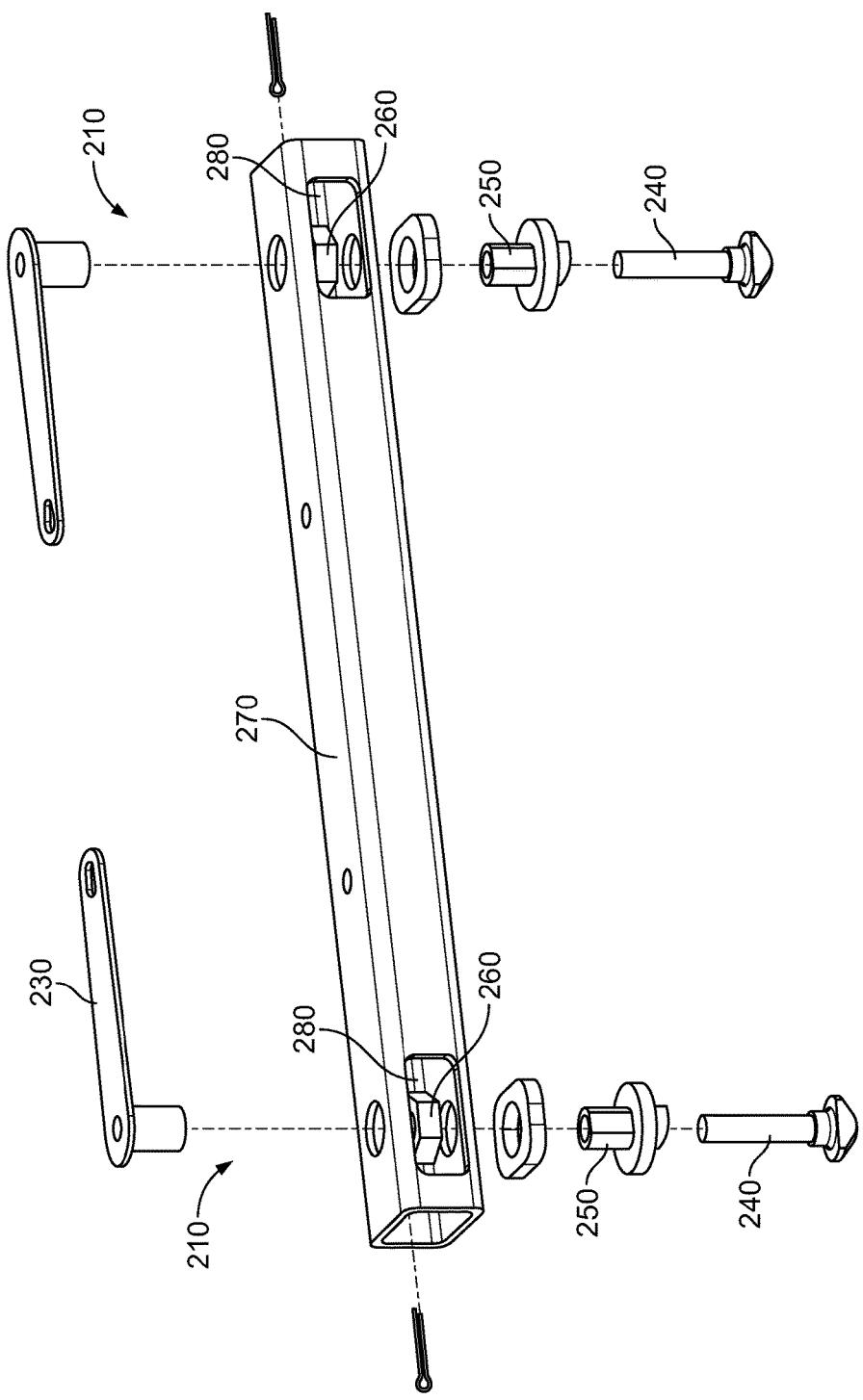
FIG. 12 is an exploded perspective view of an embodiment of a rail of the fifth wheel hitch.
Figure 13:
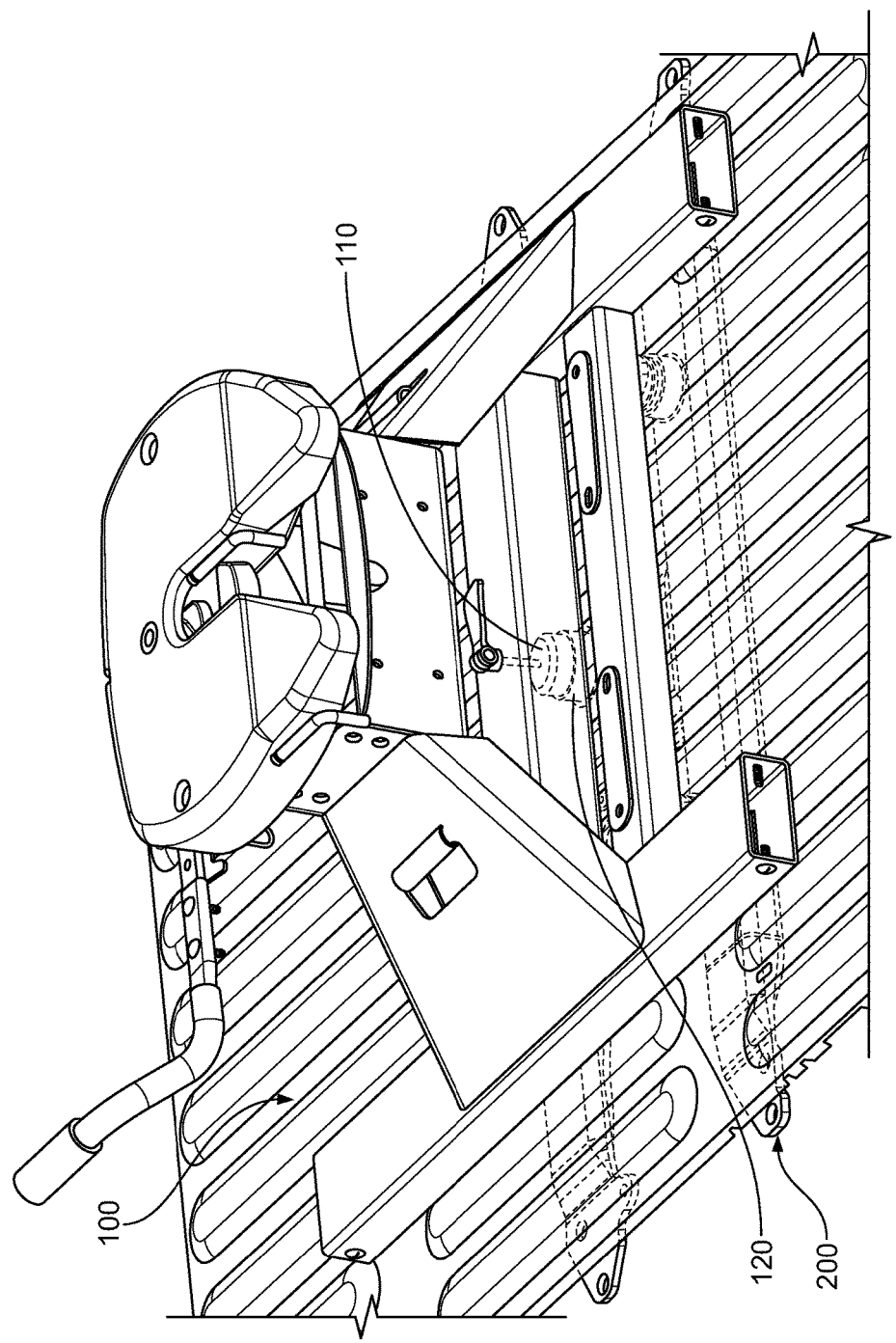
FIG. 13 is a perspective view of the underbed hitch mounting system attached to the fifth wheel hitch in phantom on a bed of a vehicle.

FIG. 12 illustrates an embodiment of the fasteners 210 may be quarter turn locking assemblies as shown in an exploded view. Each fastener 210 may include a handle 230, T-bold 240, locater bushing 250, adjustable locknut 260 that are adapted to be attached to a rail 270. The rail 270 may include access slots 280 to provide access to the adjustable locknut 260 to adjust the vertical position of the T-bolt along an axis of rotation. Once the T-bolt 240 is inserted into the secondary receivers 220, the handle 230 may be rotated a quarter turn to be aligned with the rail 270 and lock the fastener 210 within the secondary receiver 220. Notably, the locater bushing 250 may be adjusted along a plane generally parallel to the bed 130 to assist aligning the fasteners 210 with the secondary receivers 220.

Figure 14:
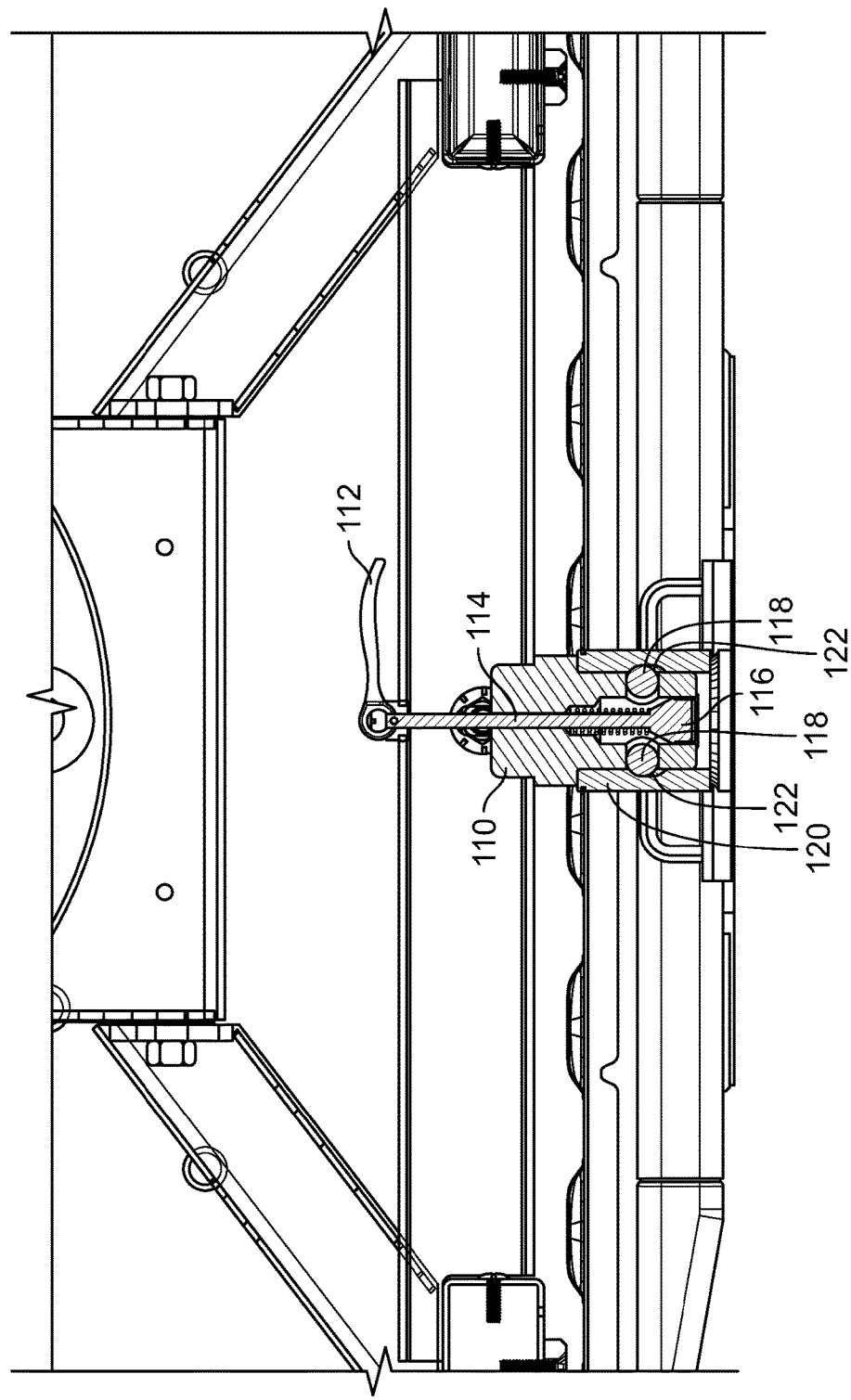
FIG. 14 is a cross sectional view of the underbed hitch mounting system attached to the fifth wheel hitch on the bed of the vehicle.
Figure 15:
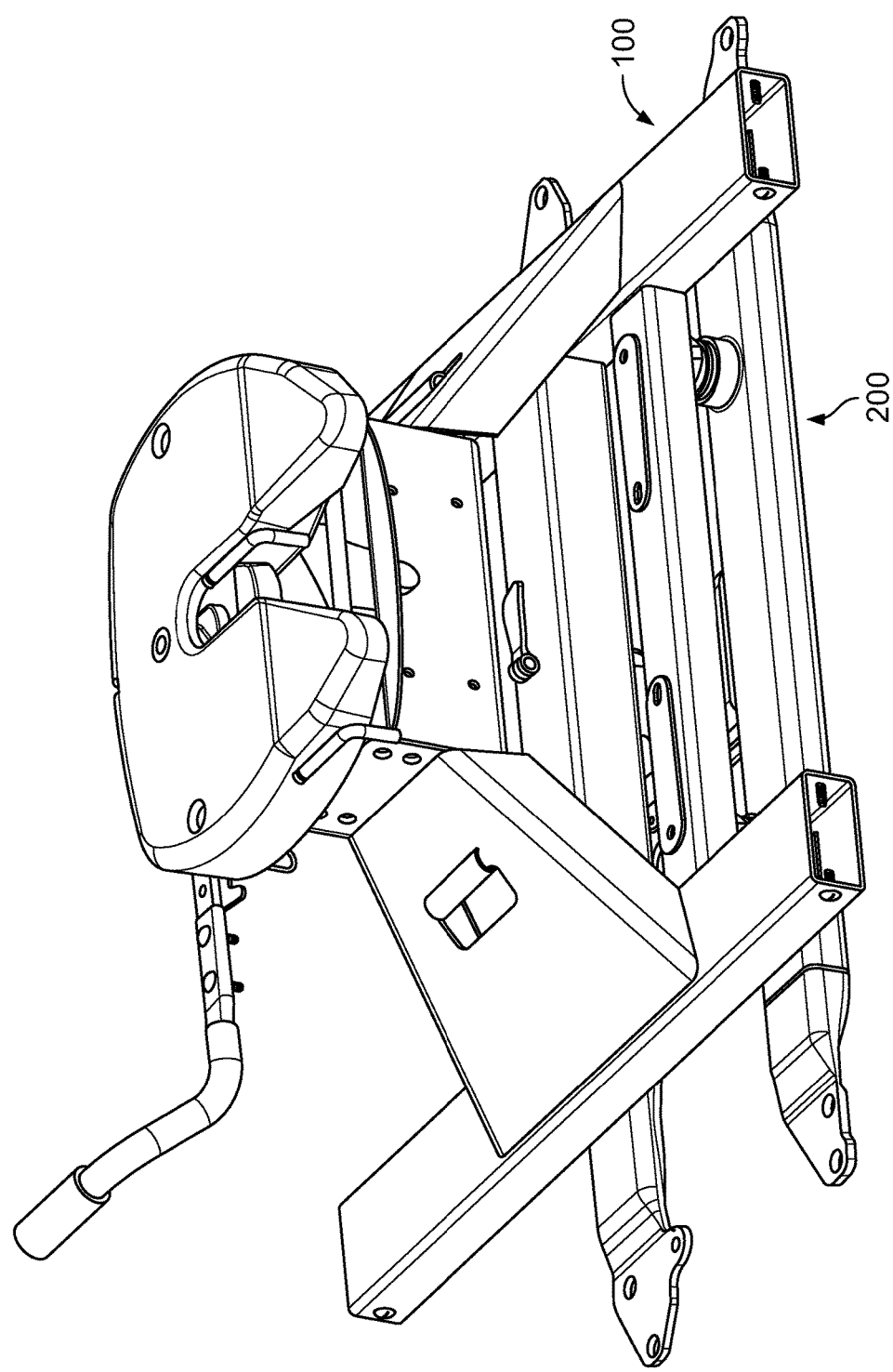
FIG. 15 is a perspective view of the underbed hitch mounting system attached to the fifth wheel hitch.

FIG. 14 illustrates an embodiment of the attachment device 110 as it is attached to the primary receiver 120. In one embodiment, the attachment device 110 is positioned in alignment along the center of the fifth wheel conversion member 100 and may extend from a mid rail of the fifth wheel conversion member 100 and be aligned along a common axis with a king pin to be received therein (not shown). The attachment device 110 may include a an engagement handle 112, adjustable locking rod 114, spring loaded bearing clamp 116, and ball bearings 118. The primary receiver 120 may include recesses 122 adapted to selectively lock the ball bearings 118 within the primary receiver 120. The handle 112 may translate the rod 114 to bias the spring loaded bearing clamp 116 to position the bearings 118 in an open or locked position.

FIGS. 16 through 22 illustrate an adapter assembly 300 that may be interconnected between a fifth wheel conversion member 100' and the underbed hitch 200. The hitch 200 may be positioned on the vehicle as an underbed style hitch. This configuration can be attached to an existing substructure of a vehicle and may simplify attaching or removing accessories such as fifth wheel hitch conversion members from truck beds. The adapter assembly 300 may carry some of the loads and forces which may reduce stresses on the hitch under bed system 200.

The hitch 200 may include a plurality of secondary receivers 220 as disclosed above. The adapter assembly 300 may be configured to attach to the receivers 220 of the hitch 200 above the bed 130 of the vehicle. The adapter assembly 300 may include a plurality of apertures 310 or attachment points with which may be operably attached to the fifth wheel conversion member 100'. The hitch 200 may be attached to the vehicle such that a bed liner is positioned between the hitch 200 and the adapter assembly 300 as it may be mounted above the bed liner of the vehicle. The adapter assembly 300 may provide a mounting location for various accessories to be attached thereon such as the fifth wheel conversion member, bicycle, cargo mounting assembly, or motorcycle carrier assembly, etc.

The adapter assembly 300 may include a locking system 320 having a plurality of fasteners. The fasteners may be similar to the locking assemblies 210 with T-bolts attached to rotating handles as disclosed above. The fasteners 320 may be received within the receivers 220 and can be rotated to positively lock the adapter assembly 300 to the hitch 200. Additionally, the fifth wheel conversion member 100' may be operably attached to the adapter assembly 300. The fifth wheel conversion member 100' any include a plurality of legs 140 wherein each leg 140 extends to a perimeter of the adapter assembly 300 and may be operably attached to the apertures 310. The legs 140 may be attached to the apertures in a variety of manners known in the art and this application is not limited.

Figure 16:
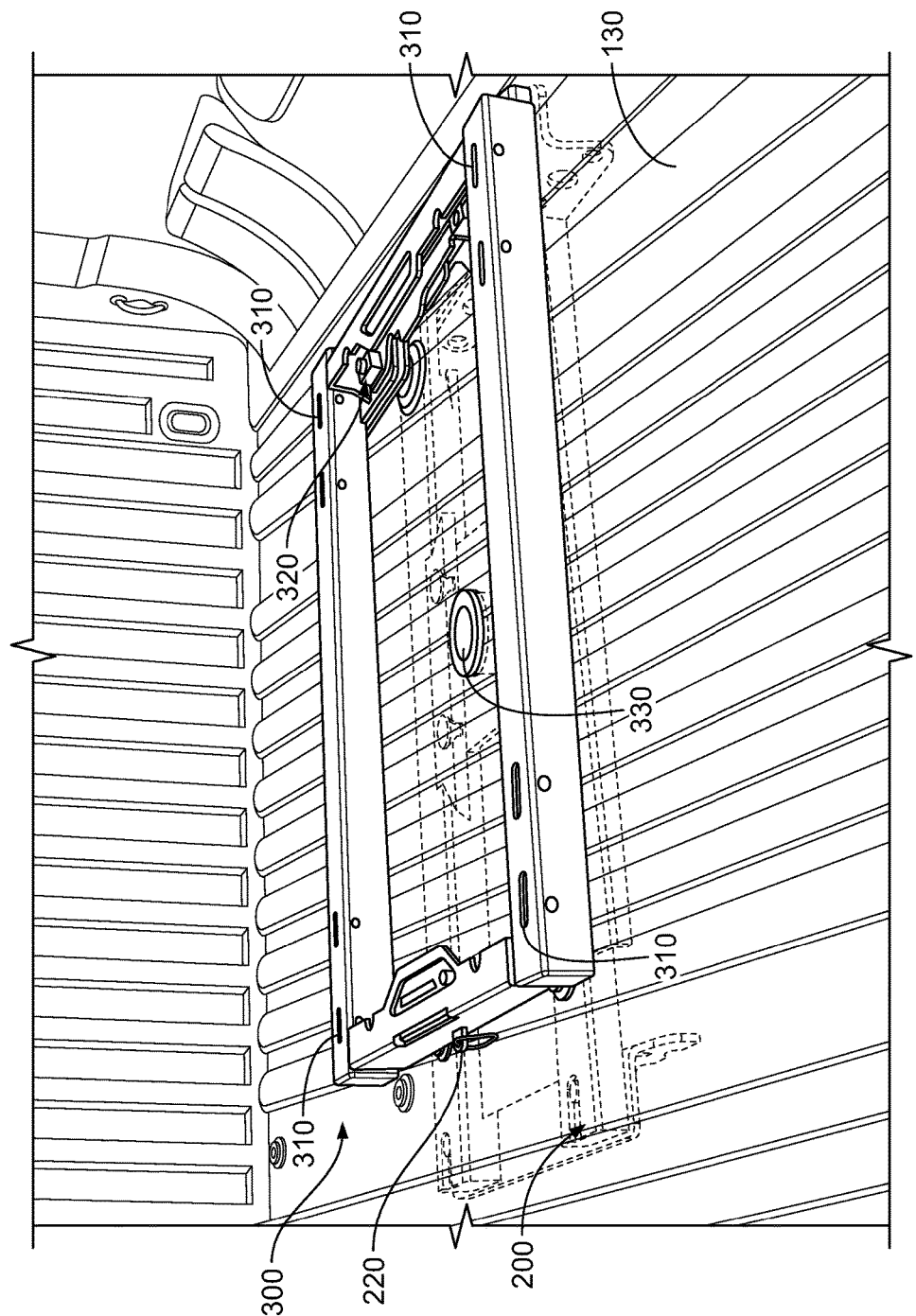
FIG. 16 is a perspective view of an embodiment of an adapter frame in accordance with the present disclosure.
Figure 17:
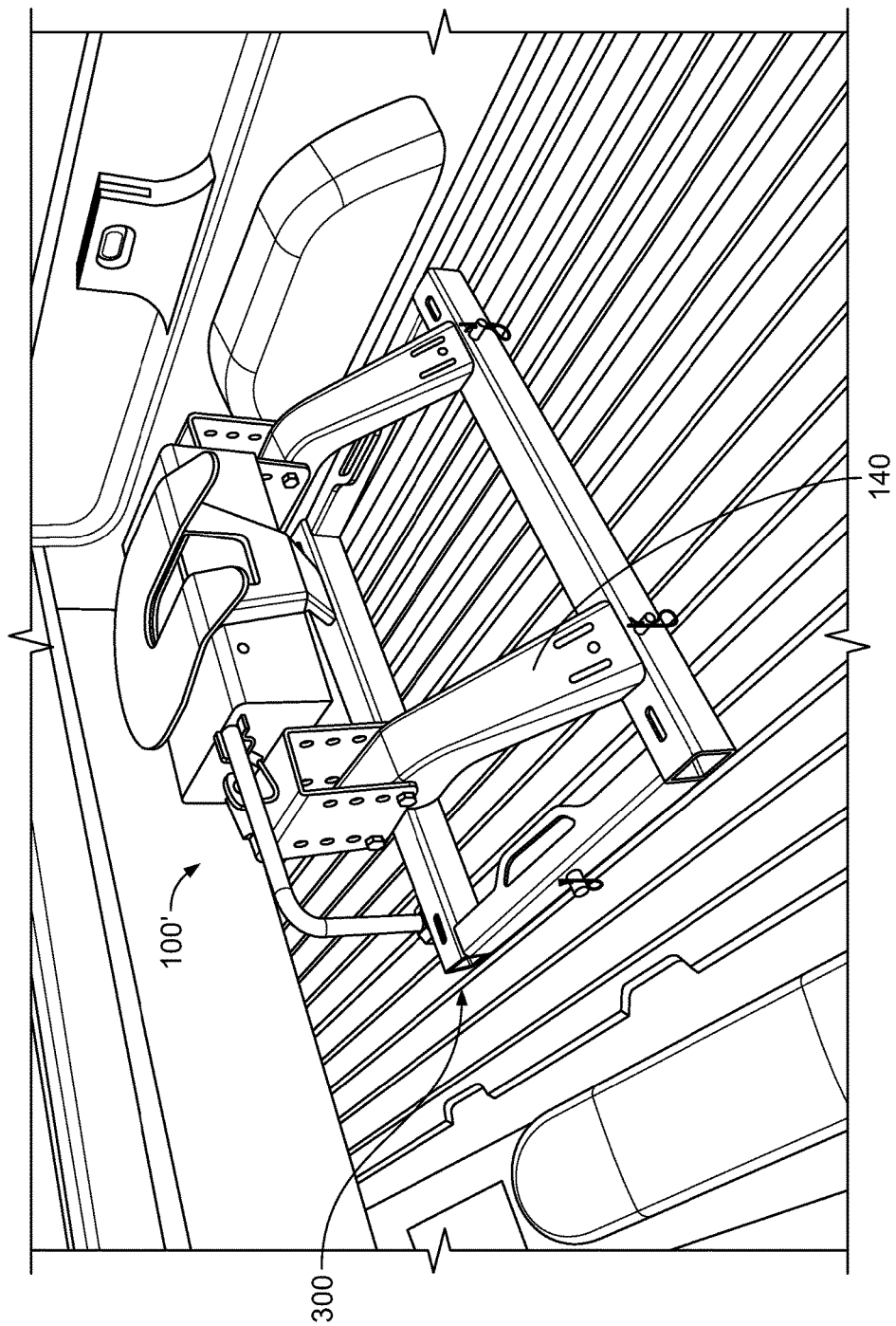
FIG. 17 is a perspective view of an embodiment of the adapter frame attached to a fifth wheel hitch and the bed of a vehicle.

In the embodiment illustrated by FIGS. 16 and 17, the adapter assembly 300 is connected to four (4) points of connection with the underbed hitch 200.

Figure 18B:
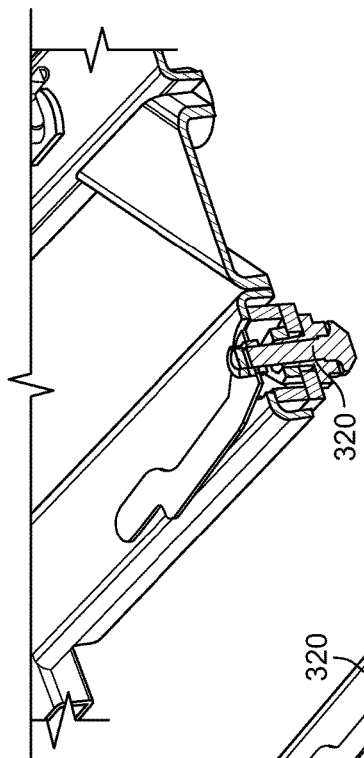
FIG. 18B is a perspective cross sectional view of a locking system of the adapter frame of FIG. 18A.
Figure 18C:
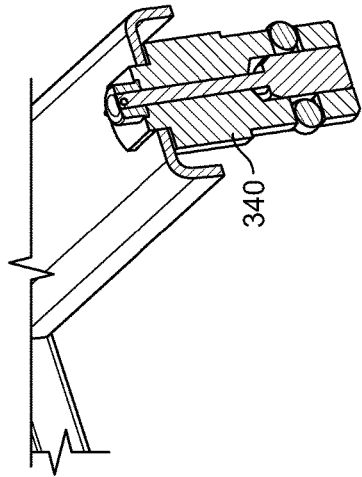
FIG. 18C is a perspective cross sectional view of a locking system of the adapter frame of FIG. 18A.
Figure 18A:
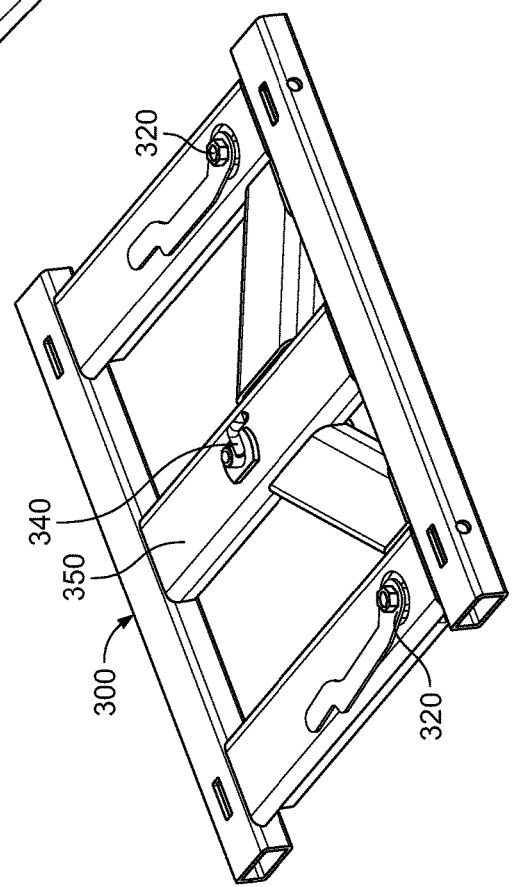
FIG. 18A is a perspective view of an embodiment of the adapter frame in accordance with the present disclosure.
Figure 19A:
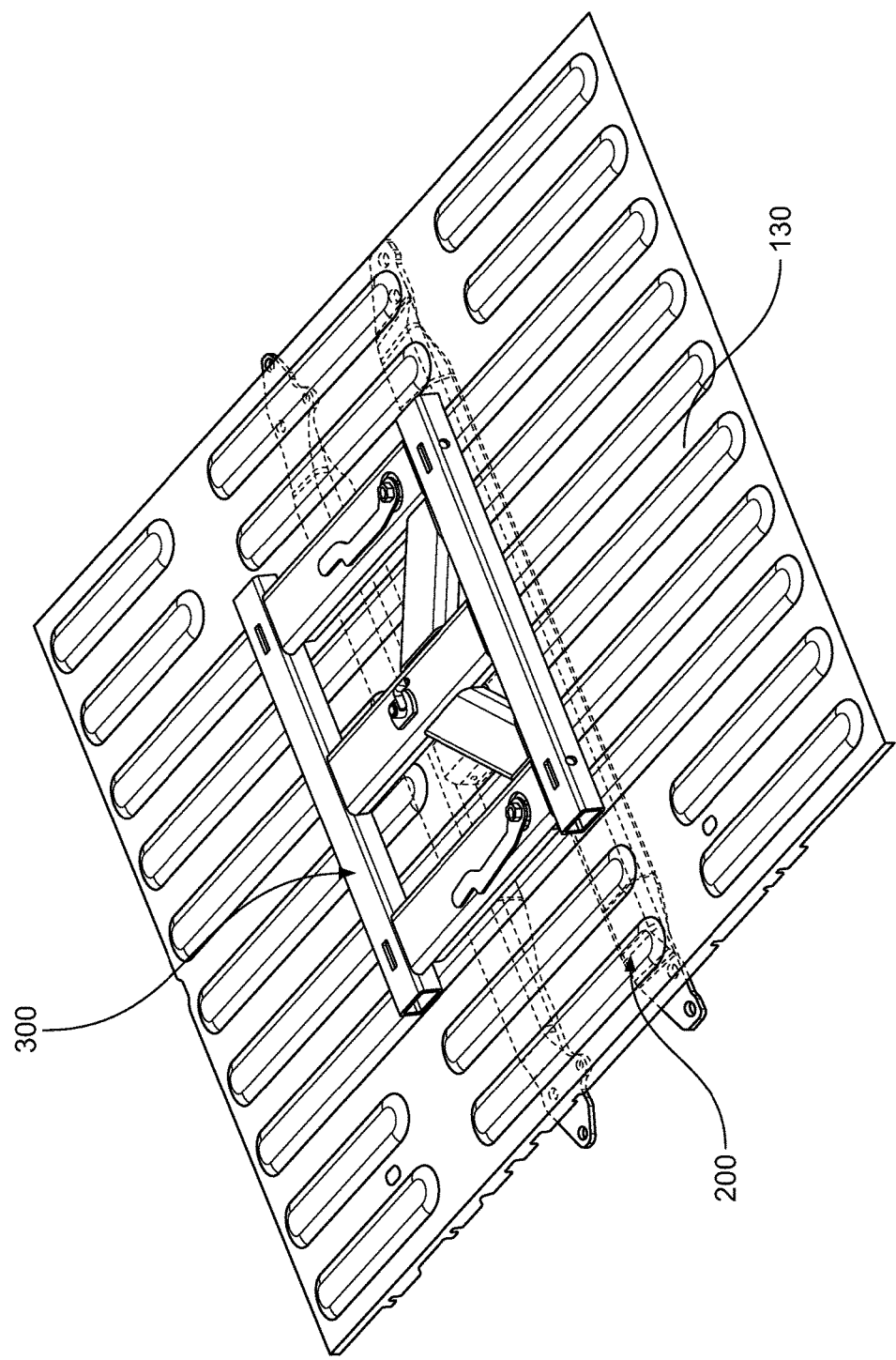
FIG. 19A is a perspective view of an embodiment of the adapter frame attached to the underbed hitch mounting system.
Figure 19B:
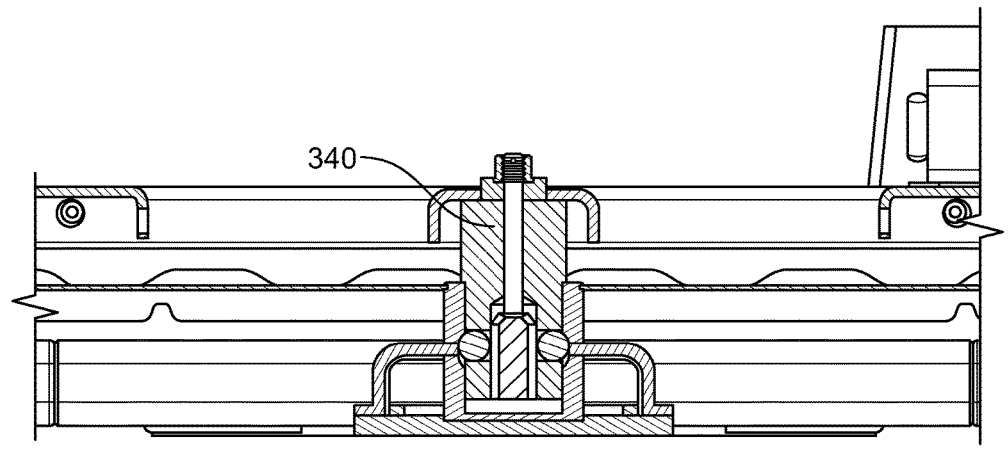
FIG. 19B is a perspective cross sectional view of a locking system of the adapter frame of FIG. 19A.
Figure 19C:
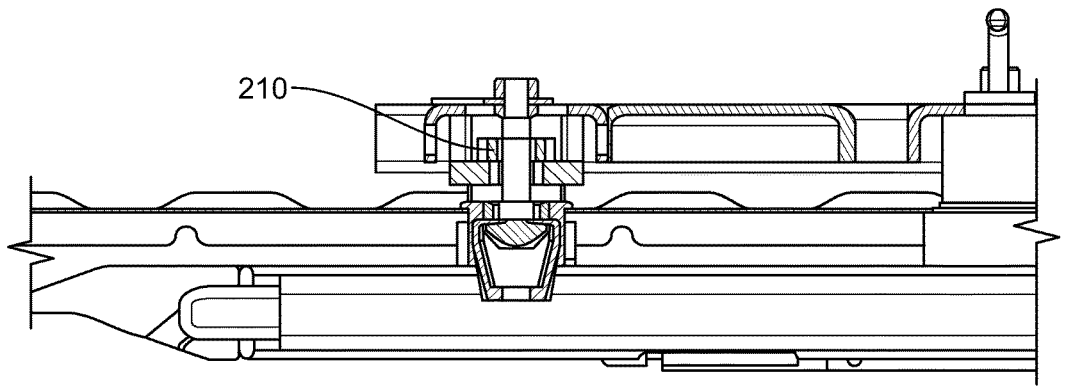
FIG. 19C is a perspective cross sectional view of a locking system of the adapter frame of FIG. 19A.
Figure 20A:
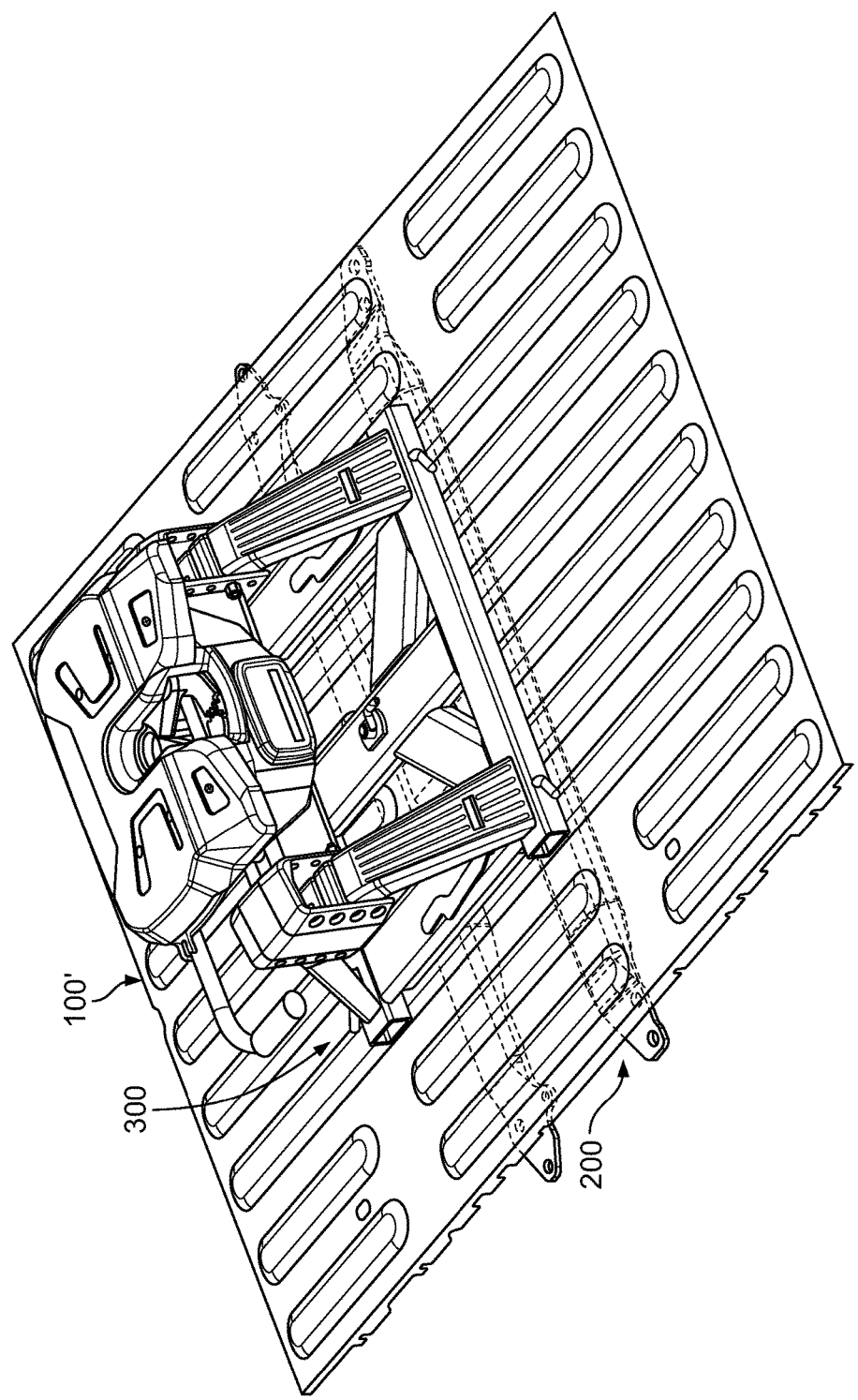
FIG. 20A is a perspective view of an embodiment of the adapter frame attached to the underbed hitch mounting system and the fifth wheel hitch.
Figure 20B:
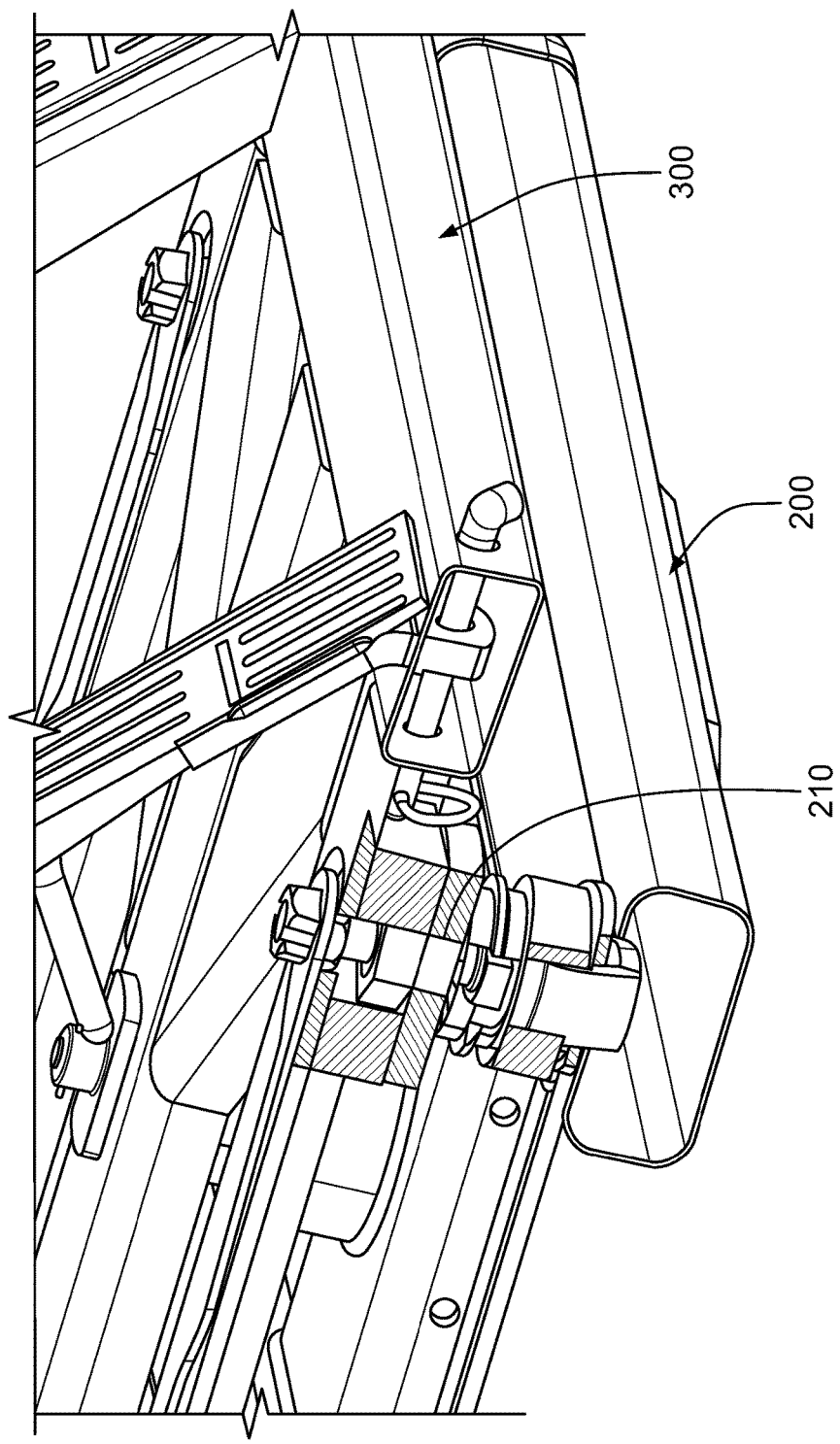
FIG. 20B is a perspective cross sectional view of a locking system of the adapter frame and fifth wheel hitch of FIG. 20A.

In one embodiment, as illustrated by FIG. 18-20, the adapter assembly 300 may be a rectangular shaped structural body that is mounted to only two (2) points of the hitch 200 wherein at least one of the mounting points is to a gooseneck round collar 330 similar to the primary receiver 120 shown above. In another embodiment, the adapter assembly 300 is mounted to only three (3) points of the hitch 200 wherein two points of connection include fasteners 210. The primary connection point may be a primary receiver 330 such as a gooseneck round collar 330. Secondary connections may be made to at least one of the other drop in connection points 220 wherein no additional fixed mounting points are required and no modification of the truck bed is required. By mounting the adapter assembly 300 to the hitch 200 at the gooseneck round collar 330 and at least one of the receivers 220, the adapter assembly 300 may prevent the fifth wheel conversion member 100' or other accessories mounted thereon, from twisting or otherwise unwanted rotation relative to the hitch 200 and vehicle bed while traveling with a towed vehicle.

The primary mounting to the gooseneck round collar 330 may include a attachment device 340, similar to attachment device 110 above, that is attached to a mid rail 350 of the adapter assembly 300. This attachment device 340 may contain a ball joint that is complimentary with the collar 330 for operable structural attachment therein. The ball joint may be manually locked and unlocked by a user and be dropped in compatible for quick connection and removal of the adapter assembly 300. The secondary or tertiary mounting maybe with a clamping t-bolt, rod, or fastener assembly in either one or two of the receivers 220. These mounting points may be illustrated by FIGS. 18B, 19C and 20B while the primary mounting points are illustrated by FIGS. 18C and 19B.

Figure 21A:
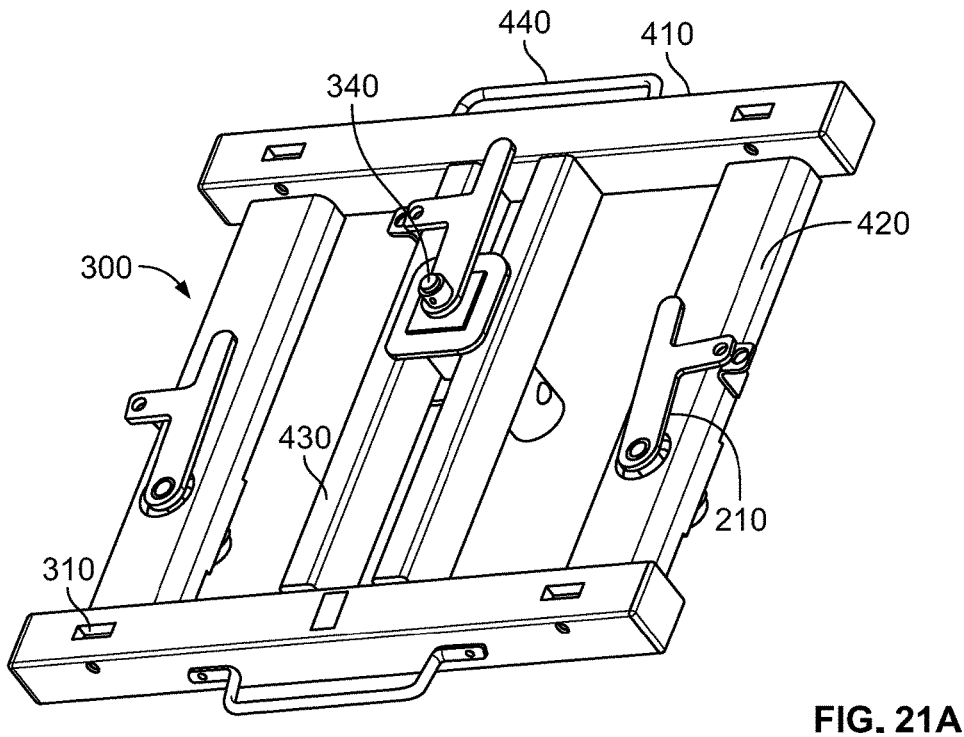
FIG. 21A is a perspective view of an embodiment of an adapter frame in accordance with the present disclosure.
Figure 21B:
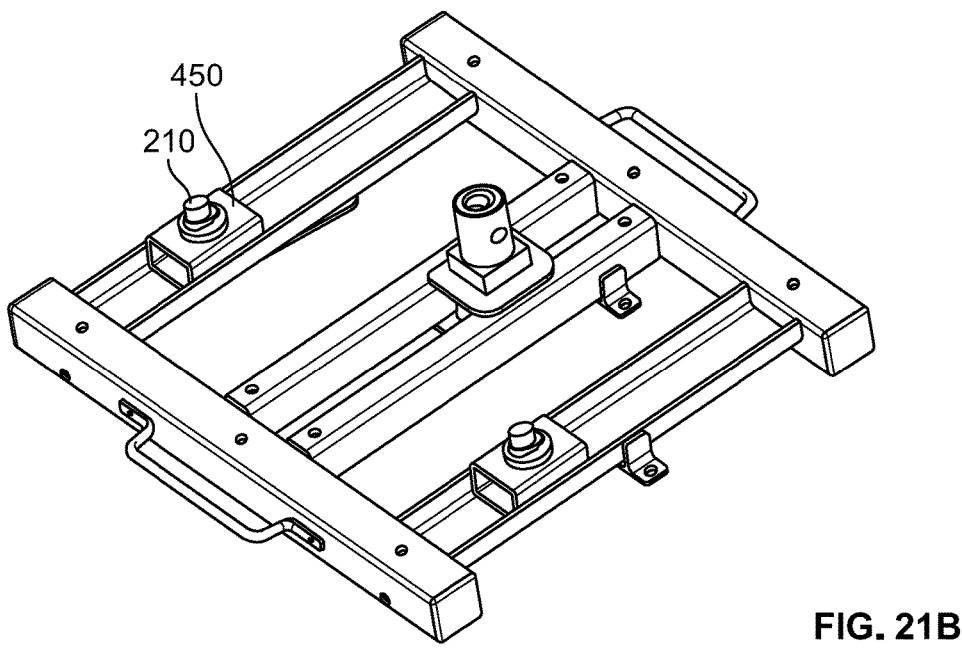
FIG. 21B is a perspective bottom view of the adapter frame of FIG. 21A.

FIGS. 21 and 22 illustrate additional embodiments of the 2 or 3 point adapter assembly 300. FIGS. 21A and 21B illustrate an adapter assembly 300 with a generally rectangular frame. The frame may include rails 410 and cross beams 420 and a mid rail 430 that extends between the cross beams 420. Handles 440 may be positioned along the rails 410. Apertures, 310 may be positioned along the rails 410. The cross beams 420 may include generally c-shaped cross sections defining a channel along a bottom side. Fasteners 210 may be positioned along the cross beams 420 and extend through a structural base 450 positioned within the channel of the cross beam 410. The attachment member 340 may be located along the mid rail 430 and be adjustable along the mid rail 430 between the rails 410. The attachment member 340 may include a handle that includes a similar orientation as the handles of the fasteners 210. Further, the handles of the attachment member 340 or fasteners 210 may include apertures that are configured to align with apertures on the cross beams/mid rail to receive a locking member (not shown) to lock the attachment member 340 or fasteners 210 in place.

Figure 22A:
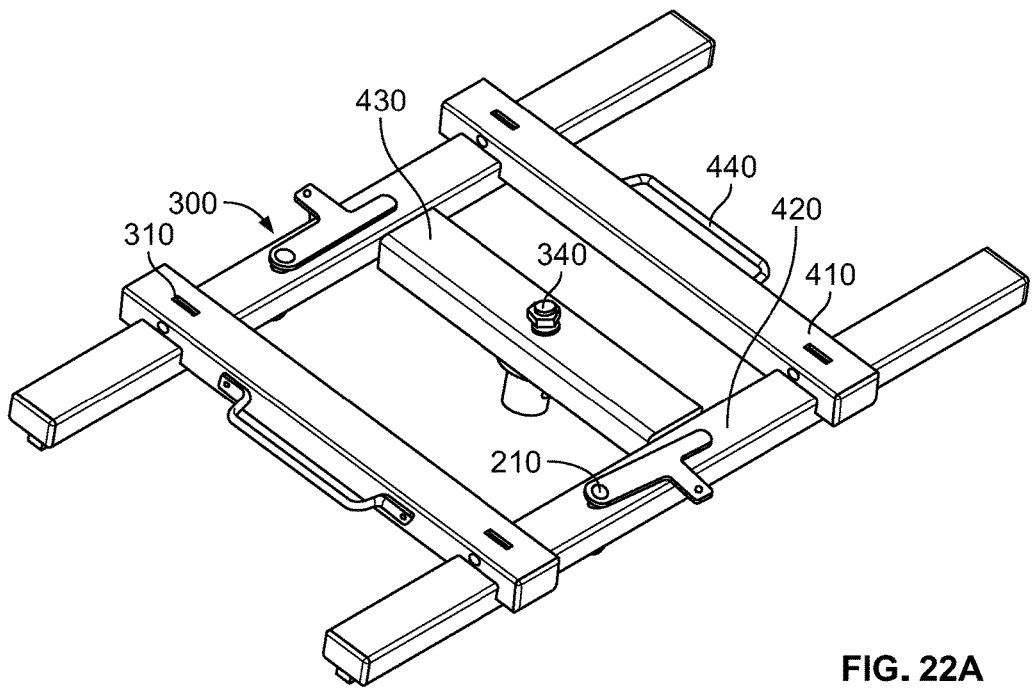
FIG. 22A is a perspective view of an embodiment of an adapter frame in accordance with the present disclosure.
Figure 22B:
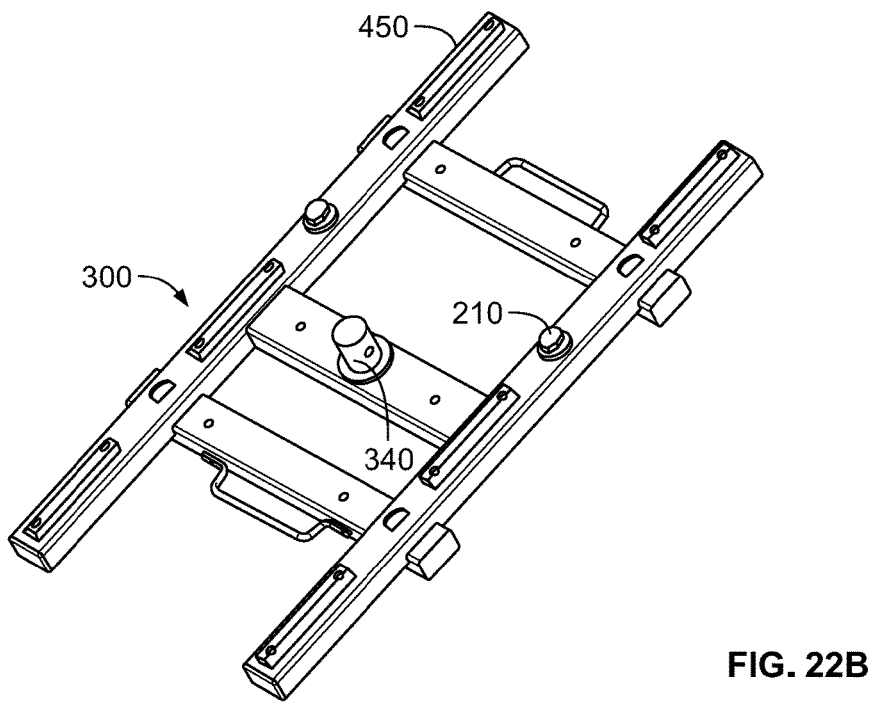
FIG. 22B is a perspective bottom view of the adapter frame of FIG. 22A.

FIGS. 22A and 22B illustrate an embodiment of the adapter assembly having a generally rectangular shaped frame. The frame may include rails 410 and cross beams 420 with a mid rail 430 that extends between the cross beams 420. Handles 4120 may be positioned along the rails 410. The rails 410 may be adjustable relative to the cross beams 420. Additionally, apertures 310 may be positioned along the rails 410 for connection to an accessory such as a fifth wheel conversion member. A plurality of pads 450 may be positioned along a bottom side of the rails 410 opposite from apertures 310. The pads 450 may be made of a high durometer rubber and placed to abut against the bed of the vehicle at strategic points to spread high fore or aft loads that may be acting on the adapter assembly 300 from the fifth wheel conversion member.

The invention has been described with reference to the embodiments. Obviously, modifications and alternations will occur to others upon a reading and understanding of this specification. The claims as follows are intended to include all modifications and alterations insofar as they come within the scope of the claim or an equivalent thereof.

Having thus described the invention, we claim:

1. A hitch mounting system for a vehicle comprising:
   an underbed hitch mounting system capable of attaching to the vehicle below a load bed of the vehicle;
   an adapter assembly selectively attachable to the underbed hitch mounting system; and
   a fifth wheel conversion member selectively attached to the adapter assembly
   wherein the adapter assembly is attached to the underbed hitch mounting system at only two points of connection.

2. A hitch mounting system for a vehicle comprising:
   an underbed hitch mounting system capable of attaching to the vehicle below a load bed of the vehicle;
   an adapter assembly selectively attachable to the underbed hitch mounting system; and
   a fifth wheel conversion member selectively attached to the adapter assembly
   wherein the adapter assembly is attached to the underbed hitch mounting system at only three points of connection.

3. An adapter assembly for mounting to an underbed hitch mounting system on a load bed of a vehicle comprising:
   at least one rail including apertures for mounting at least one cargo accessory;
   at least one cross beam extending from the at least one rail and including at least one fastener configured to be selectively attached to an underbed hitch mounting system;
   a mid rail including an attachment device to be received within a primary receiver of the underbed hitch mounting system.

4. The adapter assembly of claim 3, wherein there are two points of attachment between the adapter assembly and underbed hitch mounting system.

5. The adapter assembly of claim 4, wherein there are three points of attachment between the adapter assembly and the underbed hitch mounting system.

6. The adapter assembly of claim 3, wherein the cargo accessory is a fifth wheel conversion member.

\* \* \* \* \*